(12) United States Patent
Kakutani

(10) Patent No.: US 7,961,355 B2
(45) Date of Patent: Jun. 14, 2011

(54) GENERATION OF DITHER MATRIX

(75) Inventor: Toshiaki Kakutani, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 719 days.

(21) Appl. No.: 12/004,419

(22) Filed: Dec. 20, 2007

(65) Prior Publication Data

US 2008/0158611 A1    Jul. 3, 2008

(30) Foreign Application Priority Data

Dec. 27, 2006   (JP) .................................. 2006-352627

(51) Int. Cl.
*G06F 15/00*   (2006.01)
(52) U.S. Cl. ........ 358/3.13; 358/1.8; 358/1.9; 358/3.06; 358/534
(58) Field of Classification Search ............ 358/1.1, 358/1.8, 1.9, 3.01, 3.03, 3.06, 3.13, 3.16, 358/3.18, 534, 535, 536
See application file for complete search history.

(56) References Cited

U.S. PATENT DOCUMENTS

| 5,341,228 A * | 8/1994 | Parker et al. .............. 358/534 |
| 6,714,320 B1 | 3/2004 | Nakahara et al. |
| 6,906,825 B1 | 6/2005 | Nakahara et al. |
| 2006/0050316 A1 * | 3/2006 | Kakutani .............. 358/3.3 |

FOREIGN PATENT DOCUMENTS

| JP | 07-177351 | 7/1995 |
| JP | 10-157167 | 6/1998 |
| JP | 2000-094717 | 4/2000 |
| JP | 2000-094717 A | 4/2000 |
| JP | 2000-141714 | 5/2000 |
| JP | 2000-141714 A | 5/2000 |
| JP | 2002-016802 | 1/2002 |
| JP | 2003-094731 | 4/2003 |
| JP | 2003-094731 A | 4/2003 |
| JP | 2005-236768 | 9/2005 |
| JP | 2005-269527 | 9/2005 |
| JP | 2006-086882 | 3/2006 |
| JP | 2006-086882 A | 3/2006 |
| JP | 2006-157756 | 6/2006 |
| JP | 2006-157756 A | 6/2006 |
| JP | 2007-015359 | 1/2007 |
| JP | 2007-049443 | 2/2007 |

* cited by examiner

*Primary Examiner* — Thomas D Lee
(74) *Attorney, Agent, or Firm* — Nutter McClennen & Fish LLP; John J. Penny, Jr.

(57) ABSTRACT

A printing method includes: providing a print head that includes a plurality of nozzle arrays for ejecting at least 3 colors of inks; performing a halftone process with a dither matrix on image data to generate dot data that represents a state of dot formation at each pixel. The dither matrix includes a single reference matrix that is set by determining threshold values in the reference matrix based on a predetermined index value being calculated based on an arrangement pattern of at least two colors of dot groups among M colors (M is an integer of at least 3 and less or equal to N) of dot groups among the at least N colors of dot groups, with respect to at least some tone values among the input tone values.

12 Claims, 32 Drawing Sheets

$$VTF(u) = 5.05 \cdot \exp\left(\frac{-0.138\,\pi\,L \cdot u}{180}\right)$$
$$\cdot \left\{1-\exp\left(\frac{-0.1\,\pi\,L \cdot u}{180}\right)\right\} \quad \cdots F1$$

$$\text{GRAININESS INDEX} = K\int FS(u) \cdot VTF(u)\,du \quad \cdots F2$$

EMBODIMENT 1

Fig.11

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 | 1 | 3 | 1 | 3 | 1 | 3 | 1 | 3 |
| ROW 2 | 2 | 4 | 2 | 4 | 2 | 4 | 2 | 4 |
| ROW 3 | 1 | 3 | 1 | 3 | 1 | 3 | 1 | 3 |
| ROW 4 | 2 | 4 | 2 | 4 | 2 | 4 | 2 | 4 |
| ROW 5 | 1 | 3 | 1 | 3 | 1 | 3 | 1 | 3 |
| ROW 6 | 2 | 4 | 2 | 4 | 2 | 4 | 2 | 4 |
| ROW 7 | 1 | 3 | 1 | 3 | 1 | 3 | 1 | 3 |
| ROW 8 | 2 | 4 | 2 | 4 | 2 | 4 | 2 | 4 |

~M0

MAIN SCAN DIRECTION →

SUB-SCAN DIRECTION ↓

|  | 1 | 2 | 3 | 4 | 5 | 6 | 7 | 8 |
|---|---|---|---|---|---|---|---|---|
| 1 | 1 |  | 1 |  | 1 |  | 1 |  |
| 2 |  |  |  |  |  |  |  |  |
| 3 | 1 |  | 1 |  | 1 |  | 1 |  |
| 4 |  |  |  |  |  |  |  |  |
| 5 | 1 |  | 1 |  | 1 |  | 1 |  |
| 6 |  |  |  |  |  |  |  |  |
| 7 | 1 |  | 1 |  | 1 |  | 1 |  |
| 8 |  |  |  |  |  |  |  |  |

M3:

|  | 1 | 2 | 3 | 4 | 5 | 6 | 7 | 8 |
|---|---|---|---|---|---|---|---|---|
| 1 |  | 3 |  | 3 |  | 3 |  | 3 |
| 2 |  |  |  |  |  |  |  |  |
| 3 |  | 3 |  | 3 |  | 3 |  | 3 |
| 4 |  |  |  |  |  |  |  |  |
| 5 |  | 3 |  | 3 |  | 3 |  | 3 |
| 6 |  |  |  |  |  |  |  |  |
| 7 |  | 3 |  | 3 |  | 3 |  | 3 |
| 8 |  |  |  |  |  |  |  |  |

M2:

|  | 1 | 2 | 3 | 4 | 5 | 6 | 7 | 8 |
|---|---|---|---|---|---|---|---|---|
| 1 |  |  |  |  |  |  |  |  |
| 2 | 2 |  | 2 |  | 2 |  | 2 |  |
| 3 |  |  |  |  |  |  |  |  |
| 4 | 2 |  | 2 |  | 2 |  | 2 |  |
| 5 |  |  |  |  |  |  |  |  |
| 6 | 2 |  | 2 |  | 2 |  | 2 |  |
| 7 |  |  |  |  |  |  |  |  |
| 8 | 2 |  | 2 |  | 2 |  | 2 |  |

M4:

|  | 1 | 2 | 3 | 4 | 5 | 6 | 7 | 8 |
|---|---|---|---|---|---|---|---|---|
| 1 |  |  |  |  |  |  |  |  |
| 2 |  | 4 |  | 4 |  | 4 |  | 4 |
| 3 |  |  |  |  |  |  |  |  |
| 4 |  | 4 |  | 4 |  | 4 |  | 4 |
| 5 |  |  |  |  |  |  |  |  |
| 6 |  | 4 |  | 4 |  | 4 |  | 4 |
| 7 |  |  |  |  |  |  |  |  |
| 8 |  | 4 |  | 4 |  | 4 |  | 4 |

Fig.16

STATE OF DOT FORMATION AFTER DIGITIZATION (ALL PIXELS, ALL INKS)

| | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 | COLUMN 11 | COLUMN 12 |
|---|---|---|---|---|---|---|---|---|---|---|---|---|
| ROW 1  | 1 | 0 | 0 | 0 | 0 | 0 | 0 | 0 | 0 | 0 | 0 | 0 |
| ROW 2  | 0 | 0 | 0 | 0 | 0 | 0 | 0 | 0 | 1 | 0 | 0 | 0 |
| ROW 3  | 1 | 0 | 1 | 0 | 0 | 0 | 0 | 0 | 0 | 0 | 0 | 0 |
| ROW 4  | 0 | 0 | 0 | 0 | 0 | 1 | 0 | 0 | 0 | 0 | 1 | 0 |
| ROW 5  | 0 | 0 | 1 | 0 | 1 | 0 | 0 | 0 | 0 | 0 | 0 | 0 |
| ROW 6  | 0 | 0 | 0 | 0 | 0 | 0 | 0 | 1 | 0 | 0 | 0 | 1 |
| ROW 7  | 0 | 0 | 0 | 0 | 1 | 0 | 0 | 0 | 0 | 0 | 0 | 0 |
| ROW 8  | 0 | 1 | 0 | 0 | 0 | 0 | 0 | 0 | 0 | 1 | 0 | 0 |
| ROW 9  | 0 | 0 | 0 | 0 | 0 | 0 | 0 | 0 | 0 | 0 | 0 | 0 |
| ROW 10 | 0 | 0 | 0 | 1 | 0 | 0 | 0 | 0 | 0 | 0 | 0 | 0 |
| ROW 11 | 0 | 0 | 0 | 0 | 0 | 0 | 0 | 0 | 0 | 0 | 0 | 0 |
| ROW 12 | 0 | 0 | 0 | 0 | 0 | 0 | 1 | 0 | 0 | 0 | 0 | 0 |

Ddacmy

Fig.18

**STATE OF DOT FORMATION AFTER DIGITIZATION
(ALL PIXELS, CYAN INK)**

| | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 | COLUMN 11 | COLUMN 12 |
|---|---|---|---|---|---|---|---|---|---|---|---|---|
| ROW 1 | 1 | 0 | 0 | 0 | 0 | 0 | 0 | 0 | 0 | 0 | 0 | 0 |
| ROW 2 | 0 | 0 | 0 | 0 | 0 | 0 | 0 | 0 | 0 | 0 | 0 | 0 |
| ROW 3 | 1 | 0 | 0 | 0 | 0 | 0 | 0 | 0 | 0 | 0 | 0 | 0 |
| ROW 4 | 0 | 0 | 0 | 0 | 0 | 1 | 0 | 0 | 0 | 0 | 0 | 0 |
| ROW 5 | 0 | 0 | 0 | 0 | 0 | 0 | 0 | 0 | 0 | 0 | 0 | 0 |
| ROW 6 | 0 | 0 | 0 | 0 | 0 | 0 | 0 | 0 | 0 | 0 | 0 | 1 |
| ROW 7 | 0 | 0 | 0 | 0 | 0 | 0 | 0 | 0 | 0 | 0 | 0 | 0 |
| ROW 8 | 0 | 0 | 0 | 0 | 0 | 0 | 0 | 0 | 0 | 0 | 0 | 0 |
| ROW 9 | 0 | 0 | 0 | 0 | 0 | 0 | 0 | 0 | 0 | 0 | 0 | 0 |
| ROW 10 | 0 | 0 | 0 | 0 | 0 | 0 | 0 | 0 | 0 | 0 | 0 | 0 |
| ROW 11 | 0 | 0 | 0 | 0 | 0 | 0 | 0 | 0 | 0 | 0 | 0 | 0 |
| ROW 12 | 0 | 0 | 0 | 0 | 0 | 0 | 1 | 0 | 0 | 0 | 0 | 0 |

Ddac

Fig.19

STATE OF DOT FORMATION AFTER DIGITIZATION
(ALL PIXELS, MAGENTA INK)

|  | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 | COLUMN 11 | COLUMN 12 |
|---|---|---|---|---|---|---|---|---|---|---|---|---|
| ROW 1 | 0 | 0 | 0 | 0 | 0 | 0 | 0 | 0 | 0 | 0 | 0 | 0 |
| ROW 2 | 0 | 0 | 0 | 0 | 0 | 0 | 0 | 0 | 1 | 0 | 0 | 0 |
| ROW 3 | 0 | 0 | 1 | 0 | 0 | 0 | 0 | 0 | 0 | 0 | 0 | 0 |
| ROW 4 | 0 | 0 | 0 | 0 | 0 | 0 | 0 | 0 | 0 | 0 | 0 | 0 |
| ROW 5 | 0 | 0 | 1 | 0 | 0 | 0 | 0 | 0 | 0 | 0 | 0 | 0 |
| ROW 6 | 0 | 0 | 0 | 0 | 0 | 0 | 0 | 1 | 0 | 0 | 0 | 0 |
| ROW 7 | 0 | 0 | 0 | 0 | 0 | 0 | 0 | 0 | 0 | 0 | 0 | 0 |
| ROW 8 | 0 | 1 | 0 | 0 | 0 | 0 | 0 | 0 | 0 | 0 | 0 | 0 |
| ROW 9 | 0 | 0 | 0 | 0 | 0 | 0 | 0 | 0 | 0 | 0 | 0 | 0 |
| ROW 10 | 0 | 0 | 0 | 0 | 0 | 0 | 0 | 0 | 0 | 0 | 0 | 0 |
| ROW 11 | 0 | 0 | 0 | 0 | 0 | 0 | 0 | 0 | 0 | 0 | 0 | 0 |
| ROW 12 | 0 | 0 | 0 | 0 | 0 | 0 | 0 | 0 | 0 | 0 | 0 | 0 |

Ddam

Fig.20

STATE OF DOT FORMATION AFTER DIGITIZATION
(FIRST PIXEL GROUP, ALL INKS)

| | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 | COLUMN 11 | COLUMN 12 |
|---|---|---|---|---|---|---|---|---|---|---|---|---|
| ROW 1 | 1 | | 0 | | 0 | | 0 | | 0 | | 0 | |
| ROW 2 | | | | | | | | | | | | |
| ROW 3 | 1 | | 1 | | 0 | | 0 | | 0 | | 0 | |
| ROW 4 | | | | | | | | | | | | |
| ROW 5 | 0 | | 1 | | 1 | | 0 | | 0 | | 0 | |
| ROW 6 | | | | | | | | | | | | |
| ROW 7 | 0 | | 0 | | 1 | | 0 | | 0 | | 0 | |
| ROW 8 | | | | | | | | | | | | |
| ROW 9 | 0 | | 0 | | 0 | | 0 | | 0 | | 0 | |
| ROW 10 | | | | | | | | | | | | |
| ROW 11 | 0 | | 0 | | 0 | | 0 | | 0 | | 0 | |
| ROW 12 | | | | | | | | | | | | |

Dd1cmy

Fig.21

**STATE OF DOT FORMATION AFTER DIGITIZATION
(SECOND PIXEL GROUP, ALL INKS)**

| | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 | COLUMN 11 | COLUMN 12 |
|---|---|---|---|---|---|---|---|---|---|---|---|---|
| ROW 1 | | | | | | | | | | | | |
| ROW 2 | 0 | | 0 | | 0 | | 0 | | 1 | | 0 | |
| ROW 3 | | | | | | | | | | | | |
| ROW 4 | 0 | | 0 | | 0 | | 0 | | 0 | | 1 | |
| ROW 5 | | | | | | | | | | | | |
| ROW 6 | 0 | | 0 | | 0 | | 0 | | 0 | | 0 | |
| ROW 7 | | | | | | | | | | | | |
| ROW 8 | 0 | | 0 | | 0 | | 0 | | 0 | | 0 | |
| ROW 9 | | | | | | | | | | | | |
| ROW 10 | 0 | | 0 | | 0 | | 0 | | 0 | | 0 | |
| ROW 11 | | | | | | | | | | | | |
| ROW 12 | 0 | | 0 | | 0 | | 1 | | 0 | | 0 | |

Dd2cmy

Fig.22

STATE OF DOT FORMATION AFTER DIGITIZATION
(FIRST PIXEL GROUP, CYAN INK)

| | COL 1 | COL 2 | COL 3 | COL 4 | COL 5 | COL 6 | COL 7 | COL 8 | COL 9 | COL 10 | COL 11 | COL 12 |
|---|---|---|---|---|---|---|---|---|---|---|---|---|
| ROW 1 | 1 | | 0 | | 0 | | 0 | | 0 | | 0 | |
| ROW 2 | | | | | | | | | | | | |
| ROW 3 | 1 | | 0 | | 0 | | 0 | | 0 | | 0 | |
| ROW 4 | | | | | | | | | | | | |
| ROW 5 | 0 | | 0 | | 0 | | 0 | | 0 | | 0 | |
| ROW 6 | | | | | | | | | | | | |
| ROW 7 | 0 | | 0 | | 0 | | 0 | | 0 | | 0 | |
| ROW 8 | | | | | | | | | | | | |
| ROW 9 | 0 | | 0 | | 0 | | 0 | | 0 | | 0 | |
| ROW 10 | | | | | | | | | | | | |
| ROW 11 | 0 | | 0 | | 0 | | 0 | | 0 | | 0 | |
| ROW 12 | | | | | | | | | | | | |

STATE OF DOT FORMATION AFTER DIGITIZATION
(FIRST PIXEL GROUP, MAGENTA INK)

| | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 | COLUMN 11 | COLUMN 12 |
|---|---|---|---|---|---|---|---|---|---|---|---|---|
| ROW 1 | 0 | | 0 | | 0 | | 0 | | 0 | | 0 | |
| ROW 2 | | | | | | | | | | | | |
| ROW 3 | 0 | | 1 | | 0 | | 0 | | 0 | | 0 | |
| ROW 4 | | | | | | | | | | | | |
| ROW 5 | 0 | | 1 | | 0 | | 0 | | 0 | | 0 | |
| ROW 6 | | | | | | | | | | | | |
| ROW 7 | 0 | | 0 | | 0 | | 0 | | 0 | | 0 | |
| ROW 8 | | | | | | | | | | | | |
| ROW 9 | 0 | | 0 | | 0 | | 0 | | 0 | | 0 | |
| ROW 10 | | | | | | | | | | | | |
| ROW 11 | 0 | | 0 | | 0 | | 0 | | 0 | | 0 | |
| ROW 12 | | | | | | | | | | | | |

EVALUATION VALUE CALCULATION FORMULA OF FIRST EMBODIMENT $$E = Gacmy \times W1 + (Gac + Gam + Gay) \times W2 + \sum_{i=1}^{4} Gi\,cmy \times W3 + \sum_{i=1}^{4} (Gic + Gim + Giy) \times W4$$

E : EVALUATION VALUE

Gacmy : graininess index (all pixels, all inks)

Gac : graininess index (all pixels, cyan ink)
Gam : graininess index (all pixels, magenta ink)
Gay : graininess index (all pixels, yellow ink)

Gicmy : graininess index (each pixel group, all inks)

Gic : graininess index (each pixel group, cyan ink)
Gim : graininess index (each pixel group, magenta ink)
Giy : graininess index (each pixel group, yellow ink)

W1, W2, W3, W4 : weighting coefficient

Fig.25

EVALUATION VALUE CALCULATION FORMULA IN A MODIFICATION OF FIRST EMBODIMENT $$E = (Gacm + Gacy) \times W1 + (Gac + Gam + Gay) \times W2 + \sum_{i=1}^{4}(Gicm + Gicy) \times W3 + \sum_{i=1}^{4}(Gic + Gim + Giy) \times W4$$

E : EVALUATION VALUE

Gacm : graininess index (all pixels, cyan and magenta inks)
Gacy : graininess index (all pixels, cyan and yellow inks)

Gac : graininess index (all pixels, cyan ink)
Gam : graininess index (all pixels, magenta ink)
Gay : graininess index (all pixels, yellow ink)

Gicm : graininess index (each pixel group, cyan and magenta inks)
Gicy : graininess index (each pixel group, cyan and yellow inks)

Gic : graininess index (each pixel group, cyan ink)
Gim : graininess index (each pixel group, magenta ink)
Giy : graininess index (each pixel group, yellow ink)

W1, W2, W3, W4 : weighting coefficient

FIRST NOZZLE COLUMN GROUP: C, Y, Lc
SECOND NOZZLE COLUMN GROUP: M, K, Lm
MARK ○: OFFSET TARGETED FOR EVALUATION OF OPTIMIZATION

Fig.32

EVALUATION VALUE CALCULATION FORMULA OF SECOND EMBODIMENT $$E = \text{GacmyLc} \times W1 + (\text{Gac} + \text{Gam} + \text{Gay} + \text{GaLc}) \times W2 + \sum_{i=1}^{8} \text{Gi cmyLc} \times W3 + \sum_{i=1}^{8} (\text{Gic} + \text{Gim} + \text{Giy} + \text{GiLc}) \times W4$$

E : EVALUATION VALUE

Gacmy : graininess index (all pixels, all inks)

Gac : graininess index (each pixel group, cyan ink)
Gam : graininess index (all pixels, magenta ink)
Gay : graininess index (all pixels, yellow ink)
GaLc : graininess index (all pixels, light cyan ink)

GicmyLc : graininess index (each pixel group, all inks)

Gic : graininess index (each pixel group, cyan ink)
Gim : graininess index (each pixel group, magenta ink)
Giy : graininess index (each pixel group, yellow ink)
GiLc : graininess index (each pixel group, light cyan ink)

W1、W2、W3、W4 : weighting coefficient

Fig.33

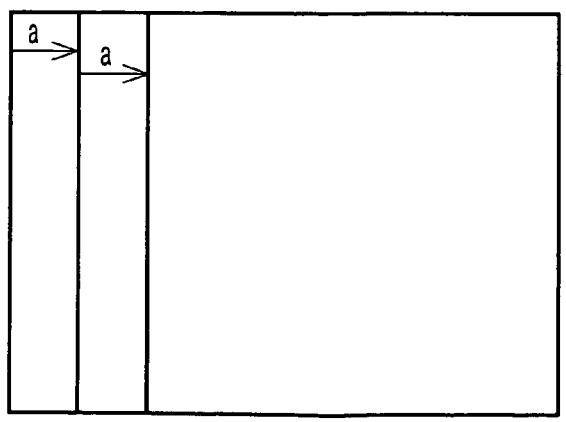

SCANNING DIRECTION

GENERATION OF DITHER MATRIX

BACKGROUND

1. Technical Field

The present invention relates to technology for printing images by forming dots on a printing medium.

2. Related Art

As output devices of images created by computers or images taken by digital cameras, printing devices that print images by forming dots on printing media are widely used. Halftone processes are employed to represent tones in such printing devices, since a smaller number of tones are available for dot formation than a number of input tone values. As one of halftone processes, ordered dither methods employing dither matrices are widely used. The ordered dither methods produce significant effects on image quality depending on how contents of the dither matrices are. Therefore, there have been attempts taken to optimize the dither matrices by means of analytical methods such as simulated annealing, genetic algorithm, and the like employing evaluation functions in consideration of human visual sensitivity, as disclosed in JP-A-7-177351, for example. Meanwhile, there have also been techniques proposed to improve dispersibility of plural types of dots in a printed image that is formed by combining the plural types of dots having different densities and/or hues from each other all together as disclosed in JP-A-10-157167.

However, in such halftone processes, no consideration has been given to deterioration of image quality that may be caused by ejecting plural colors of ink droplets on a printing medium while scanning a common print area on the printing medium and thereby printing an image (color-mixed irregularity of the plural colors of inks that may occur in each main scan).

SUMMARY

An advantage of some aspect of the invention is to provide a technique for reducing deterioration of image quality of print image that may be caused by the printing method of forming the print image with multiple scans on a common print area.

The invention provides a printing method of printing on a printing medium. The method includes: providing a print head that includes a plurality of nozzle arrays for ejecting at least N colors of inks, N being an integer of at least 3; performing a halftone process with a dither matrix on image data that represents a tone value of each pixel making up an original image to generate dot data that represents a state of dot formation at each of print pixels of a print image to be formed on the printing medium; and generating the print image by combining at least N colors of dot groups formed in at least one scan of the print head in a common print area, the plurality of nozzle arrays respectively forming dot groups having different colors each other in the each scan of the print head according to the dot data. The dither matrix includes a single reference matrix that is set in such a way that reduces contact among M colors (M is an integer of at least 3 and less or equal to N) of dot groups among the at least N colors of dot groups, with respect to at least some tone values among the input tone values. The performing includes N different halftone processes, each of the N different halftone processes being performed on each of the at least N colors of inks by using the dither matrix that includes the reference matrix and (N−1) converted matrices generated by executing one of at least one type of predetermined conversion process (N−1) times on the reference matrix.

In the printing apparatus of the present invention, dither matrices for use with at least N colors can be prepared only by executing a predetermined conversion process (N−1) times on a single reference matrix, which is set in such a way that restrains contact among M colors of dot groups among the at least N colors of dot groups. This allows for reduction of resources required for storage of dither matrix. Furthermore, since only a single reference matrix is required to be prepared in advance, this also allows for reduction of the burden on the process of dither matrix generation.

Here, note that the phrase "contact among M colors of dot groups" not only represent cases where dots of the M colors of dot groups adjoin and come into contact with each other, but also represents a broader concept including their superposition as well. The phrase "restrain contact" not only represent cases of restraining contact among the dot groups (that is, adjoining and superposition of dots), but also represents a broader concept including (1) cases of dispersing dots in contact, thereby restraining the dots that resulted in contact from coming into further contact, and/or (2) cases of focusing attention only on dispersibility of dots in contact, thereby intensively restraining the dots in contact from coming into multiplex contact. In addition, such a halftone process can be implemented by a halftone process that employs a dither matrix. Note that the predetermined conversion process is not restricted to the conversion process described below, but may also be, for example, rotation of reference matrix as well.

The present invention may also be implemented by a diversity of forms such as a dither matrix, a dither matrix generation apparatus, and a printing apparatus, a printing method, and a printed matter generation method employing the dither matrix, or by a diversity of forms such as a computer program used to attain functions of such method or apparatus, recording medium in which such computer program is recorded, and data signals including such computer program and are embodied in carrier waves.

Furthermore, the use of dither matrix in a printing apparatus, a printing method, or a printed matter generation method allows whether or not a dot is to be formed (hereinafter referred to as dot on/off state) to be determined through comparison, on a pixel-by-pixel basis, of a threshold value established in the dither matrix to a tone value of image data; however, it would also be acceptable to determine the dot on/off state by comparing the sum of a threshold value and a tone value to a fixed value, for example. It would also be acceptable to determine the dot on/off state according to a tone value, and data created previously on the basis of a threshold value, rather than using the threshold value directly. Generally speaking, the dither method of the present invention may be any method that allows the dot on/off state to be determined according a tone value of each pixel, and a threshold value established at a corresponding pixel location in a dither matrix.

BRIEF DESCRIPTION OF THE DRAWINGS

FIG. 11 shows an illustration depicting a dither matrix M subjected to a grouping process in the embodiment.

FIG. 12 shows an illustration depicting four divided matrices M1-M4 in the embodiment.

FIG. 16 is an illustration depicting a dot density matrix Ddacmy that corresponds to the evaluation dot pattern Dpacmy.

FIG. 18 is an illustration showing a dot density matrix Ddac that is obtained by extracting only cyan dots from the dot density matrix Ddacmy of all inks and of with respect to all pixels.

FIG. 19 is an illustration showing a dot density matrix Ddam that is obtained by extracting only magenta dots from the dot density matrix Ddacmy of all inks and of with respect to all pixels.

FIG. 20 is an illustration showing a dot density matrix Dd1cmy that is obtained by extracting only a first pixel group from the dot density matrix Ddacmy of all inks and of with respect to all pixels.

FIG. 21 is an illustration showing a dot density matrix Dd2cmy that is obtained by extracting only a second pixel group from the dot density matrix Ddacmy of all inks and of with respect to all pixels.

FIG. 22 is an illustration showing a dot density matrix Dd1c that is obtained by extracting only cyan dots of a first pixel group from the dot density matrix Ddacmy of all inks and of with respect to all pixels.

FIG. 23 is an illustration showing a dot density matrix Dd1m that is obtained by extracting only magenta dots of a first pixel group from the dot density matrix Ddacmy of all inks and of with respect to all pixels.

FIG. 24 is an illustration showing a calculation formula for use in a weighting and adding process of the first embodiment.

FIG. 25 is an illustration showing a calculation formula for use in a weighting and adding process of a modification of the first embodiment.

FIG. 32 is an illustration showing a calculation formula for use in a weighting and adding process of the second embodiment.

FIG. 33 is an illustration showing the contents of a matrix shifting process in a modification.

DESCRIPTION OF EXEMPLARY EMBODIMENTS

Embodiments of the present invention will be described below in the following order, for the purpose of providing a clearer understanding of operations and working effects of the present invention.

Figure 1:
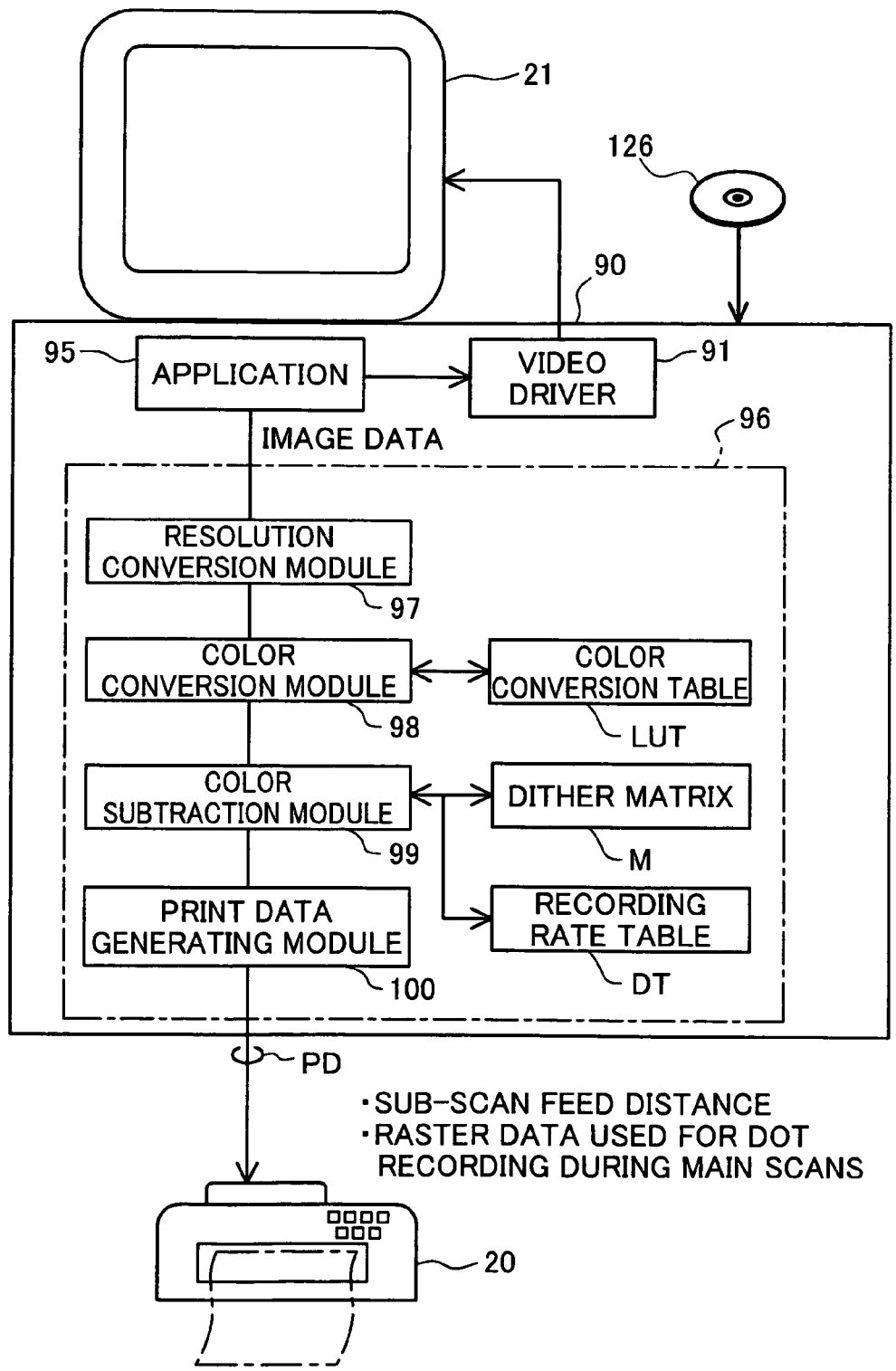
FIG. 1 is a block diagram illustrating the configuration of a printing system in the first embodiments.

A. Configuration of printing system in a first embodiment of the present invention:
B. Concept of optimization dither matrix in the first embodiment of the present invention:
C. Method of dither matrix generation in the first embodiment of the present invention:
D. Method of dither matrix generation in a second embodiment of the present invention (zigzag alignment):
 D-1. Grouping process in the second embodiment:
 D-2. Matrix shifting process in the second embodiment:
 D-3. Evaluation value determination process in the second embodiment:
E. Modifications:
 A. Configuration of Printing System in a First Embodiment:

FIG. 1 is a block diagram illustrating the configuration of a printing system in the first embodiment. This printing system is furnished with a computer 90 as a printing control device, and a color printer 20 as a print unit. The color printer 20 and the computer 90 can be termed a "printing device" in the broad sense.

On the computer 90, an application program 95 runs on a prescribed operating system. The operating system incorporates a video driver 91 and a printer driver 96; print data PD for transfer to the color printer 20 is output from the application program 95 via these drivers. The application program 95 performs the desired processing of images targeted for processing, as well as outputting images to a CRT 21 via the video driver 91.

Within the printer driver 96 are a resolution conversion module 97 for converting the resolution of an input image to the resolution of the printer; a color conversion module 98 for color conversion from RGB to CMYK; a halftone module 99 that, using an dither matrices M generated in the embodiments to be discussed later, performs halftone process of input tone values and transform them into output tone values representable by forming dots; a print data generating module 100 that uses the halftone data for the purpose of generating print data to be sent to the color printer 20; a color conversion table LUT serving as a basis for color conversion by the color conversion module 98; and a recording rate table DT for determining recording rates of dots of each size, for the halftone process. The printer driver 96 corresponds to a program for implementing the function of generating the print data PD. The program for implementing the functions of the printer driver 96 is provided in a format recorded on a computer-readable recording medium. Examples of such a recording medium are a CD-ROM 126, flexible disk, magneto-optical disk, IC card, ROM cartridge, punch card, printed matter having a bar code or other symbol imprinted thereon, a computer internal memory device (e.g. RAM, ROM, or other memory) or external memory device, or various other computer-readable media.

Figure 2:
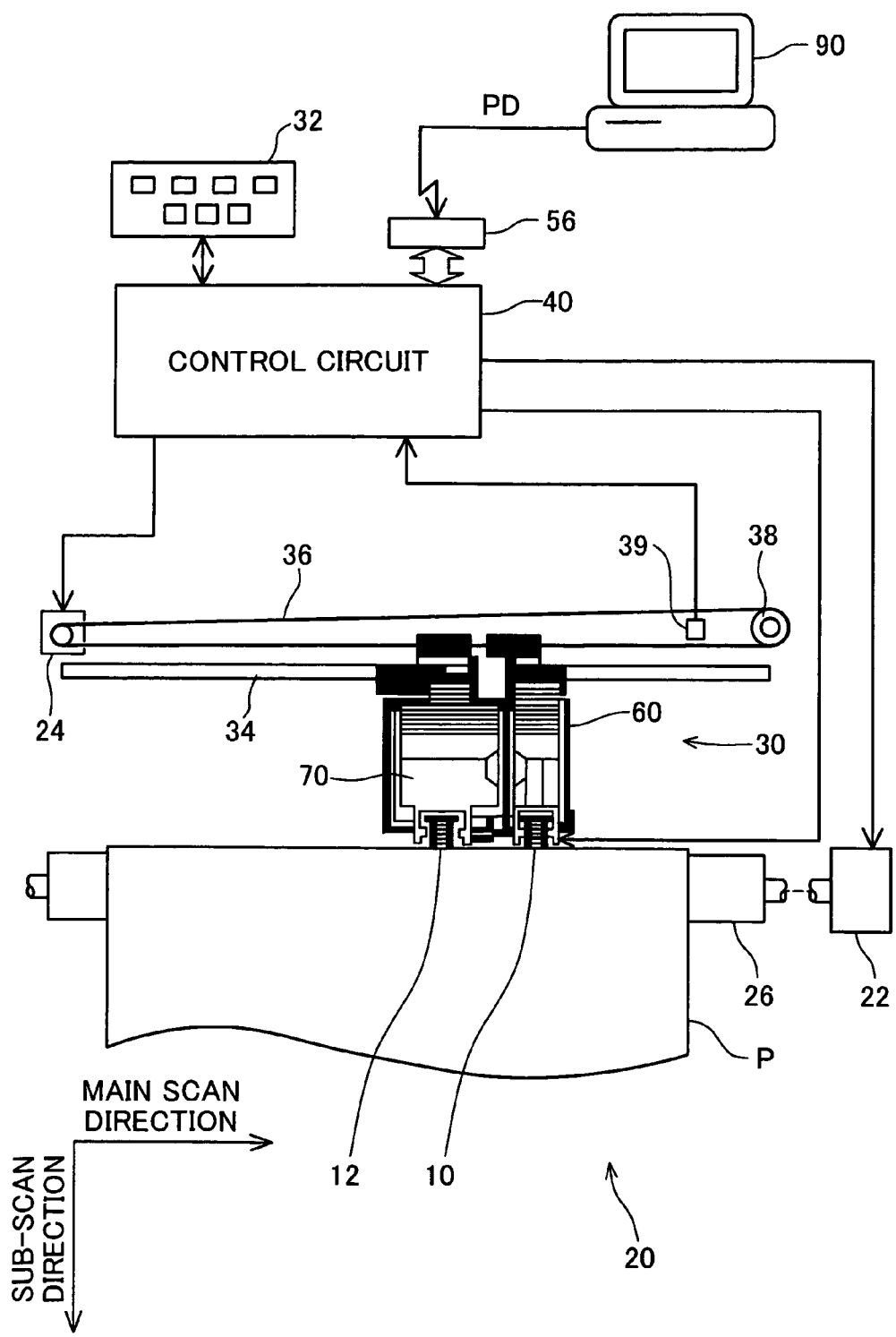
FIG. 2 is a schematic illustration of a color printer 20.

FIG. 2 is a schematic illustration of the color printer 20. The color printer 20 is equipped with a sub-scan driving portion for transporting printing paper P in the sub-scanning direction by means of a paper feed motor 22; a main scan driving portion for reciprocating a carriage 30 in the axial direction of a paper feed roller 25 (main scanning direction) by means of a carriage motor 24; a head drive mechanism for driving a print head unit 60 installed on the carriage 30 (also termed the "print head assembly") and controlling ink ejection and dot formation; and a control circuit 40 for exchange of signals with the paper feed motor 22, the carriage motor 24, the print head unit 60 equipped with the print heads 12, and a control panel 32. The control circuit 40 is connected to the computer 90 via a connector 56.

Figure 3:
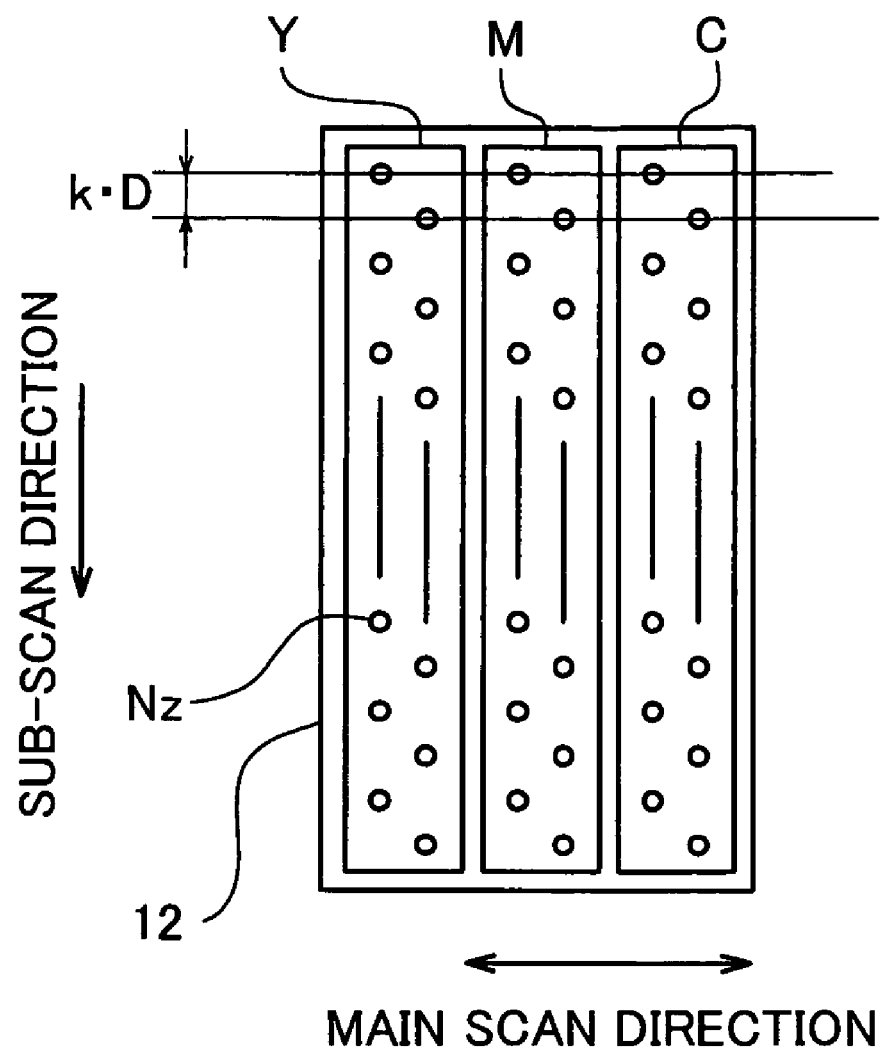
FIG. 3 is an illustration of a nozzle arrangement on the lower face of print head.

FIG. 3 is an illustration of the nozzle arrangement on the lower face of the print heads 10, 12. On the lower face of the print head 12 there are formed a cyan ink nozzle group C for ejecting cyan ink, a magenta ink nozzle group Mz for ejecting magenta ink, and a yellow ink nozzle group Y for ejecting yellow ink.

The plurality of nozzles contained in each nozzle group are respectively lined up at a constant nozzle pitch k·D, in the sub-scanning direction. Here, k is an integer, and D represents pitch equivalent to the print resolution in the sub-scanning direction (also termed "dot pitch"). This will also referred to herein as "the nozzle pitch being k dots." The "dot" unit means the dot pitch of the print resolution. Similarly, sub-scan feed distance is also expressed in "dot" units.

Each nozzle Nz is provided with a piezo element (not shown) for the purpose of driving the nozzle Nz and ejecting drops of ink. During printing, ink drops are ejected from the nozzles as the print heads 12 are scanned in the main scanning direction.

In the color printer 20 having the hardware configuration described above, as the printing paper P is transported by the paper feed motor 22, the carriage 30 is reciprocated by the carriage motor 24 while at the same time driving the piezo elements of the print head 12 to eject ink drops of each color and form dots, producing on the printing paper P an image optimized for the ocular system and the color printer 20. Specifically, a printed image is formed in the following way. In order to make the following description easier to understand, monochromatic printing using the single print head (e.g. cyan ink nozzle group C) only will be described first, and then the discussion will be expanded to include color printing.

Figure 4:
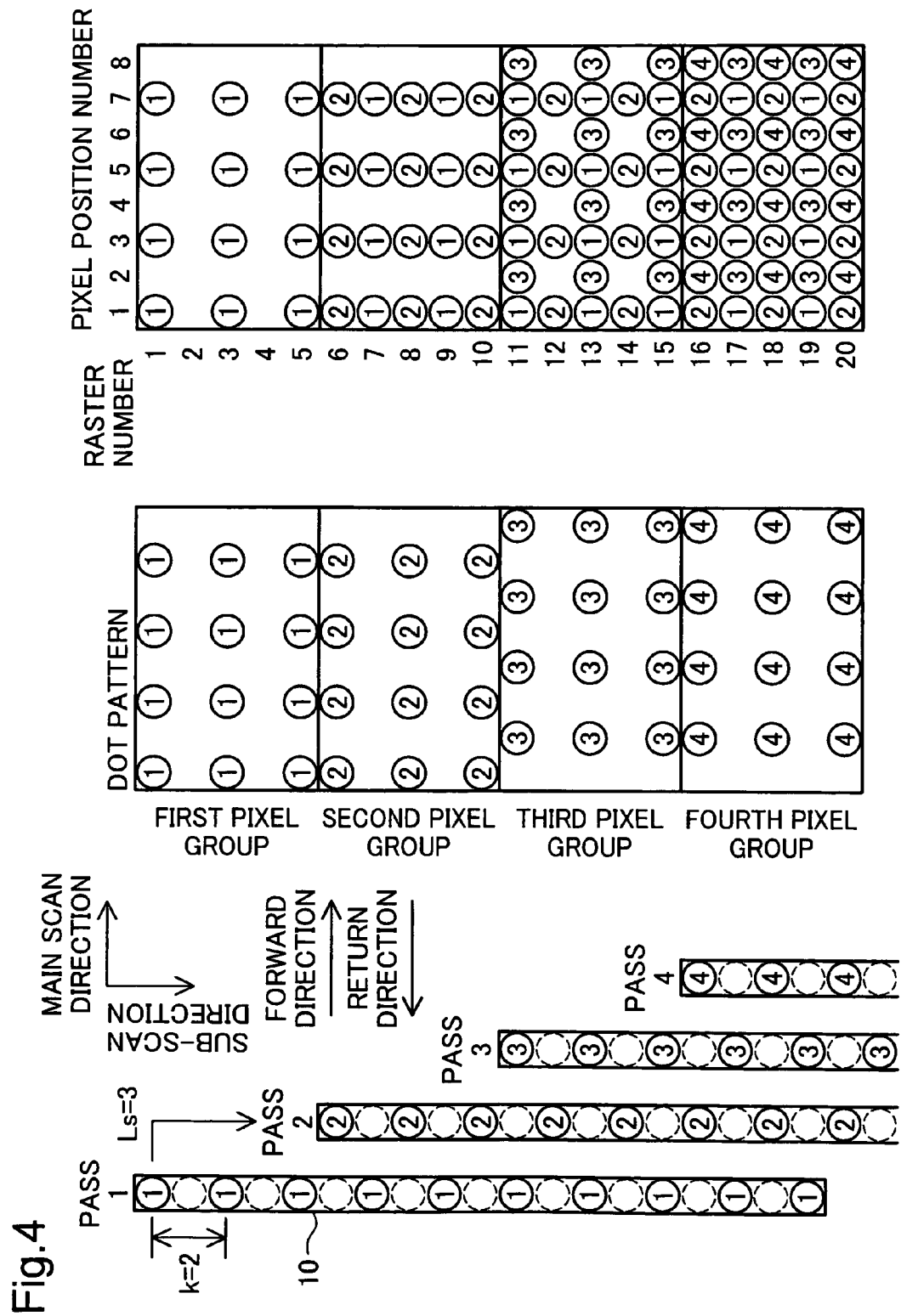
FIG. 4 is an illustration of an exemplary monochromatic print image generating process in the embodiments.

FIG. 4 is an illustration of an exemplary monochromatic print image generating process in the first embodiment. The print image is generated on the print medium by forming ink dots while performing main scan and sub-scan in this image forming methods. The main scan means the operation of moving the printing head 12 relatively in the main scanning direction in relation to the print medium. The sub-scan means the operation of moving the printing head 12 relatively in the sub-scanning direction in relation to the print medium. The printing head 12 is configured so as to form ink dots by spraying ink droplets on the print medium. The printing head 12 is equipped with ten nozzles that are not illustrated at intervals of 2 times the pixel pitch k.

Generation of the print image is performed as follows while performing main scanning and sub-scanning. Among the ten main scan lines of raster numbers 1, 3, 5, 7, 9, 11, 13, 15, 17, and 19, ink dots are formed at the pixels of the pixel position numbers 1, 3, 5, and 7. The main scan line means the line formed by the continuous pixels in the main scanning direction. Each circle indicates the dot forming position. The number inside each circle indicates the pixel groups configured from the plurality of pixels for which ink dots are formed simultaneously. With pass 1, dots are formed on the print pixels belonging to the first pixel group.

When the pass 1 main scan is completed, the sub-scan sending is performed at a movement volume Ls of 5 times the pixel pitch in the sub-scanning direction. Typically, the sub-scan sending is performed by moving the print medium, but with this embodiment, the printing head 12 is moved in the sub-scanning direction to make the description easy to understand. When the sub-scan sending is completed, the pass 2 main scan is performed.

With the pass 2 main scan, among the ten main scan lines for which the raster numbers are 6, 8, 10, 12, 14, 16, 18, 20, 22, and 24, ink dots are formed at the pixels for which the pixel position number is 1, 3, 5, and 7. Working in this way, with pass 2, dots are formed on the print pixels belonging to the second pixel group. Note that the two main scan lines for which the raster numbers are 22 and 24 are omitted in the drawing. When the pass 2 main scan is completed, after the sub-scan sending is performed in the same way as described previously, the pass 3 main scan is performed.

With the pass 3 main scan, among the ten main scan lines including the main scan lines for which the raster numbers are 11, 13, 15, 17, and 19, ink dots are formed on the pixels for which the pixel position numbers are 2, 4, 6, and 8. With the pass 4 main scan, among the ten main scan lines including the three main scan lines for which the raster numbers are 16, 18, and 20, ink dots are formed on the pixels for which the pixel position numbers are 2, 4, 6, and 8. Working in this way, we can see that it is possible to form ink dots without gaps in the sub-scan position from raster number 15 and thereafter. With pass 3 and pass 4, dots are formed on the print pixels belonging respectively to the third and fourth pixel groups.

When monitoring this kind of print image generation focusing on a fixed area, we can see that this is performed as noted below. For example, when the focus area is the area of pixel position numbers 1 to 8 with the raster numbers 15 to 19, we can see that the print image is formed as noted below at the focus area.

With pass 1, at the focus area, we can see that a dot pattern is formed that is the same as the ink dots formed at the pixel positions for which the pixel position numbers are 1 to 8 with the raster numbers 1 to 8. This dot pattern is formed by dots formed at the pixels belonging to the first pixel group. Specifically, with pass 1, for the focus area, dots are formed at pixels belonging to the first pixel group.

With pass 2, at the focus area, dots are formed at the pixels belonging to the second pixel group. With pass 3, at the focus area, dots are formed at the pixels belonging to the third pixel group. With pass 4, at the focus area, dots are formed at the pixels belonging to the fourth pixel group.

In this way, the monochromatic print with this embodiment, we can see that the dots formed at the print pixels belonging to each of the plurality of first to fourth pixel groups are formed by mutually combining at the common print area.

Meanwhile, in color printing in accordance with the present embodiment, color printed images are formed by means of ejecting ink of the colors C, Mz, Y and K from the ink head (FIG. 3), onto each of the first to fourth multiple pixel groups. In this way, in color printing inks of several colors are ejected substantially simultaneously during each main scan pass.

Figure 5:
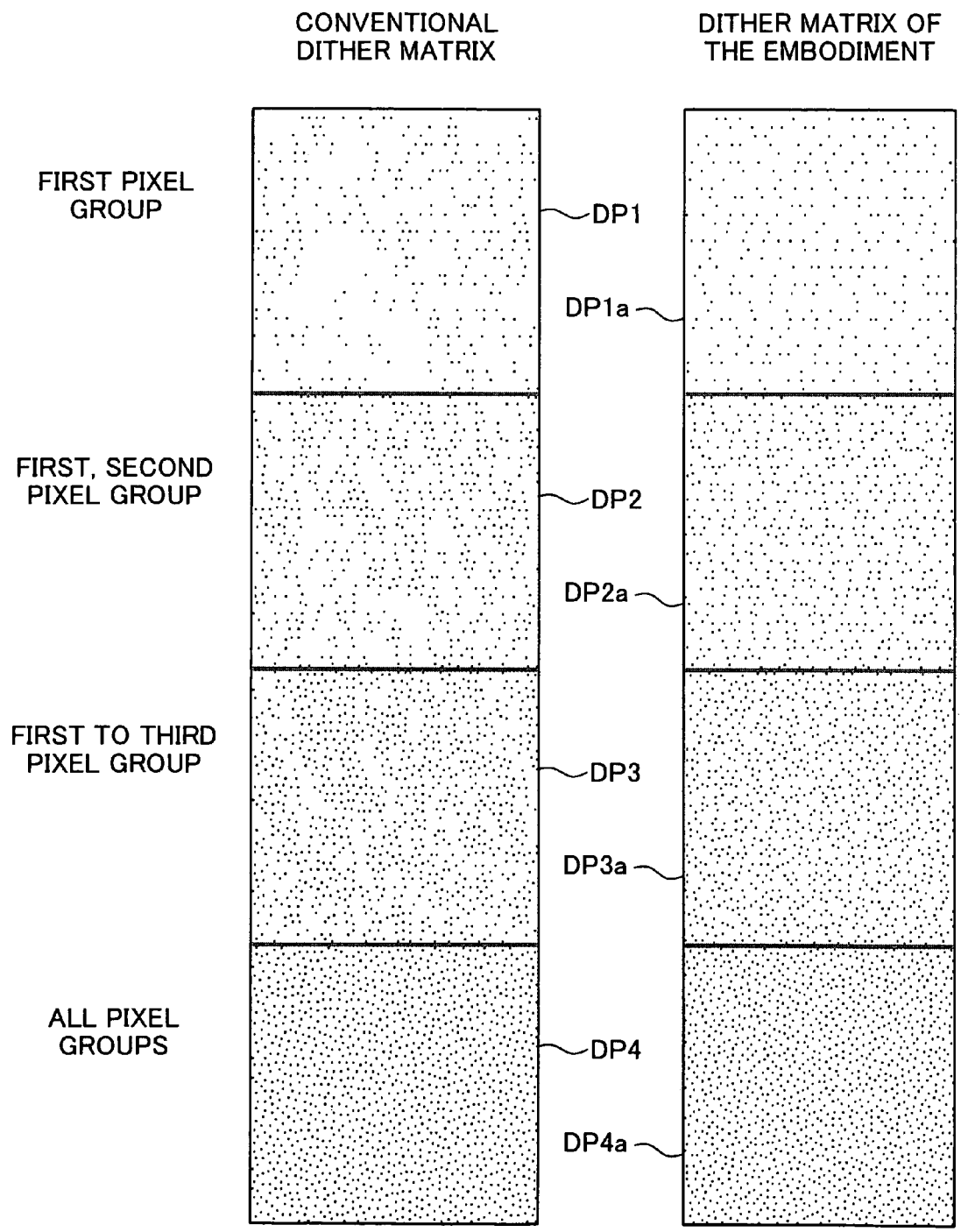
FIG. 5 is an illustration depicting creation of a printed image on a printing medium in the embodiments by means of combining, into a common printing area, print pixels that belong to multiple pixel groups.

FIG. 5 is an illustration depicting creation of a printed image on a printing medium in the embodiments by means of combining, into a common printing area, print pixels that belong to multiple pixel groups. In the example of FIG. 5, the printed image is a printed image of prescribed intermediate tone (monochrome). The dot patterns DP1, DP1a are dot patterns formed on a plurality of pixels belonging to a first pixel group. The dot patterns DP2, DP2a are dot patterns formed on a plurality of pixels belonging to the first and a second pixel group. The dot patterns DP3, DP3a are dot patterns formed on a plurality of pixels belonging to the first through a third pixel group. The dot patterns DP4, DP4a are dot patterns formed on a plurality of pixels belonging to all of the pixel groups.

The dot patterns DP1, DP2, DP3, DP4 are dot patterns obtained where a conventional dither matrix is used. The dot patterns DP1a, DP2a, DP3a, DP4a are dot patterns obtained where the dither matrix of the embodiment is used. As will be apparent from FIGS. 5A to 5D, where the dither matrix of the embodiment is used, dispersion of dots is more uniform than where a conventional dither matrix is used, especially for the dot patterns DP1a, DP2a having minimal overlap of dot pattern.

Since conventional dither matrices lack the concept of pixel groups, optimization is carried out in a manner focused exclusively on dispersion of dots in the final printed image (in the example of FIG. 5, the dot pattern DP4).

However, the inventors have carried out an analysis of image quality of printed images, focusing on the dot patterns in the course of the dot formation process. As a result of the analysis, it was found that image irregularity may arise during the dot formation process due to density level of dot patterns. The inventors discovered that such image irregularity occurs because dots of several colors formed during a given main scan pass do not overlap in a uniform manner, thus producing areas in which dots of several colors come into contact and bleed together and areas in which dots of several colors remain separate and do not bleed together, occurring in mottled patterns, which in turn causing irregular color.

Such color irregularity may occur even where a printed image is formed in a single pass. However, if color irregularity is produced uniformly throughout the entire image, it will not be readily apparent to the human visual faculty. This is because, due to the fact that the irregularity occurs uniformly, ink bleed will not take the form of nonuniform "irregularity" that includes a low-frequency component.

In a dot pattern composed of pixel groups in which ink dots are formed substantially simultaneously during a given main scan, however, if irregularity should happen to occur due to ink bleed in a low-frequency region that is readily noticeable to the human eye, it will become apparent as marked degradation of image quality. Accordingly, the inventors discovered for the first time that, where a printed image is produced by means of forming ink dots, high levels of image quality may be obtained by optimizing the dither matrix by giving attention to the dot patterns formed in pixel groups in which ink dots are formed substantially simultaneously.

However, it has been found that the use of a different dither matrix for each of a plurality colors of inks causes problems such as increased burden of processing by the printing system, increased burden on hardware resources, and the like. Furthermore, there has also been a large burden of preparing a different dither matrix for each of a plurality colors of inks.

Figure 6:
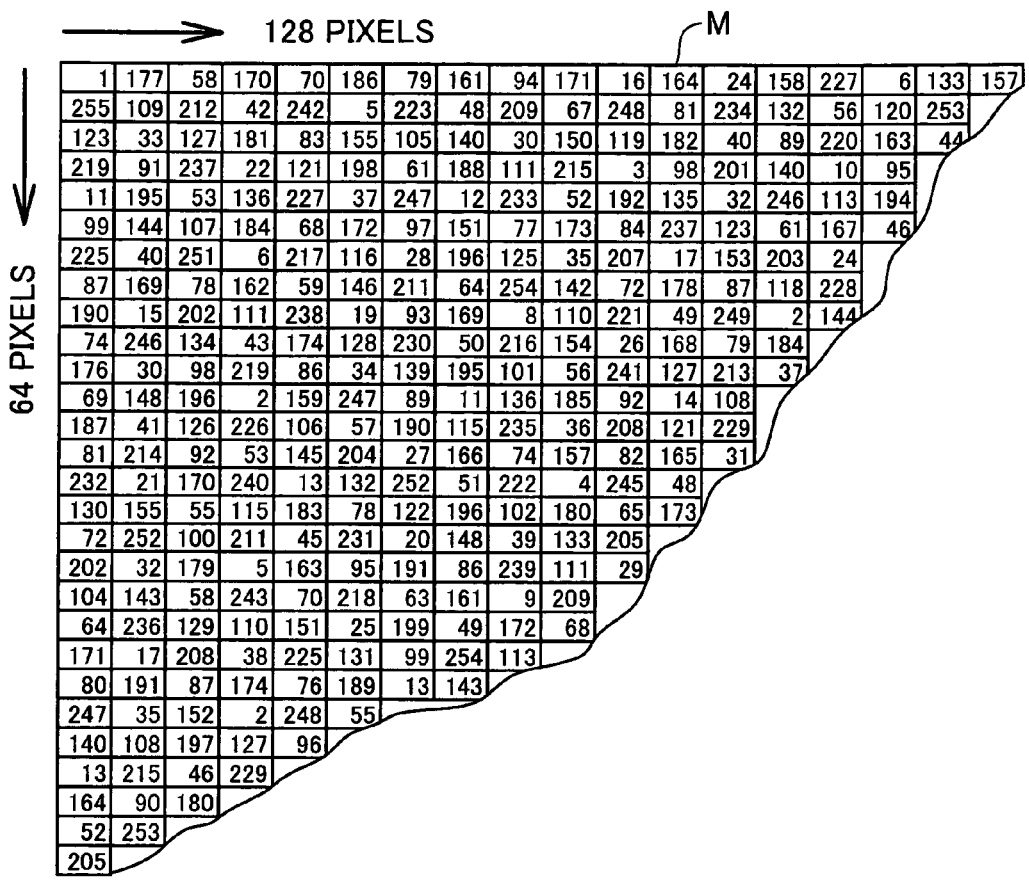
FIG. 6 shows an illustration depicting conceptually part of an exemplary dither matrix.

B. Concept of Optimized Dither Matrix in the First Embodiments:

FIG. 6 is an illustration depicting conceptually part of an exemplary dither matrix. The illustrated dither matrix contains threshold values selected evenly from a tone value range of 1 to 255, stored in a total of 8912 elements, i.e. 128 elements in the horizontal direction (main scanning direction) and 64 elements in the vertical direction (sub-scanning direction). The size of the dither matrix is not limited to that shown by way of example in FIG. 6; various other sizes are possible, including matrices having identical numbers of horizontal and vertical elements.

Figure 7:
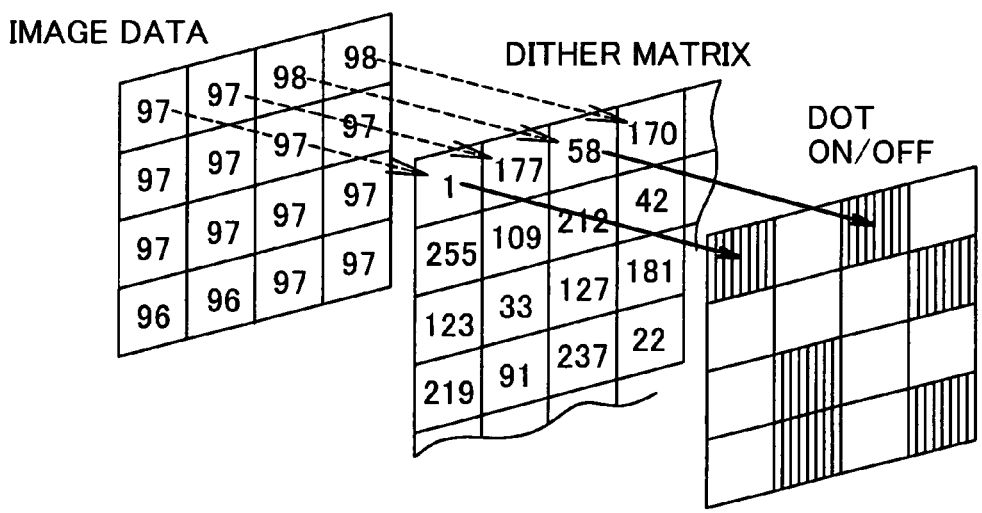
FIG. 7 shows an illustration depicting the concept of dot on/off states using a dither matrix.

FIG. 7 is an illustration depicting the concept of dot on/off states using a dither matrix. FIG. 2 is an illustration depicting the concept of dot on-off state using a dither matrix. For convenience in illustration, only a portion of the elements are shown. As depicted in FIG. 7, when determining dot on-off states, tone values contained in the image data are compared with the threshold values saved at corresponding locations in the dither matrix. In the event that a tone value contained in the image data is greater than the corresponding threshold value stored in the dither table, a dot is formed; if the tone value contained in the image data is smaller, no dot is formed. Pixels shown with hatching in FIG. 7 signify pixels targeted for dot formation. By using a dither matrix in this way, dot on-off states can be determined on a pixel-by-pixel basis, by a simple process of comparing the tone values of the image data with the threshold values established in the dither matrix, making it possible to carry out the tone number conversion process rapidly. Furthermore, once image data tone values have been determined, decisions as to whether to form dots on pixels will be made exclusively on the basis of the threshold values established in the matrix, and from this fact it will be apparent that with a systematic dither process it is possible to actively control dot production conditions by means of the threshold value storage locations established in the dither matrix.

Since with a systematic dither process it is possible in this way to actively control dot production conditions by means of the storage locations of the threshold values established in the dither matrix, a resultant feature is that dot dispersion and other picture qualities can be controlled by means of adjusting the settings of the threshold value storage locations. This means that by means of a dither matrix optimization process, it is possible to optimize the halftoning process for a wide variety of target states.

Figure 8:
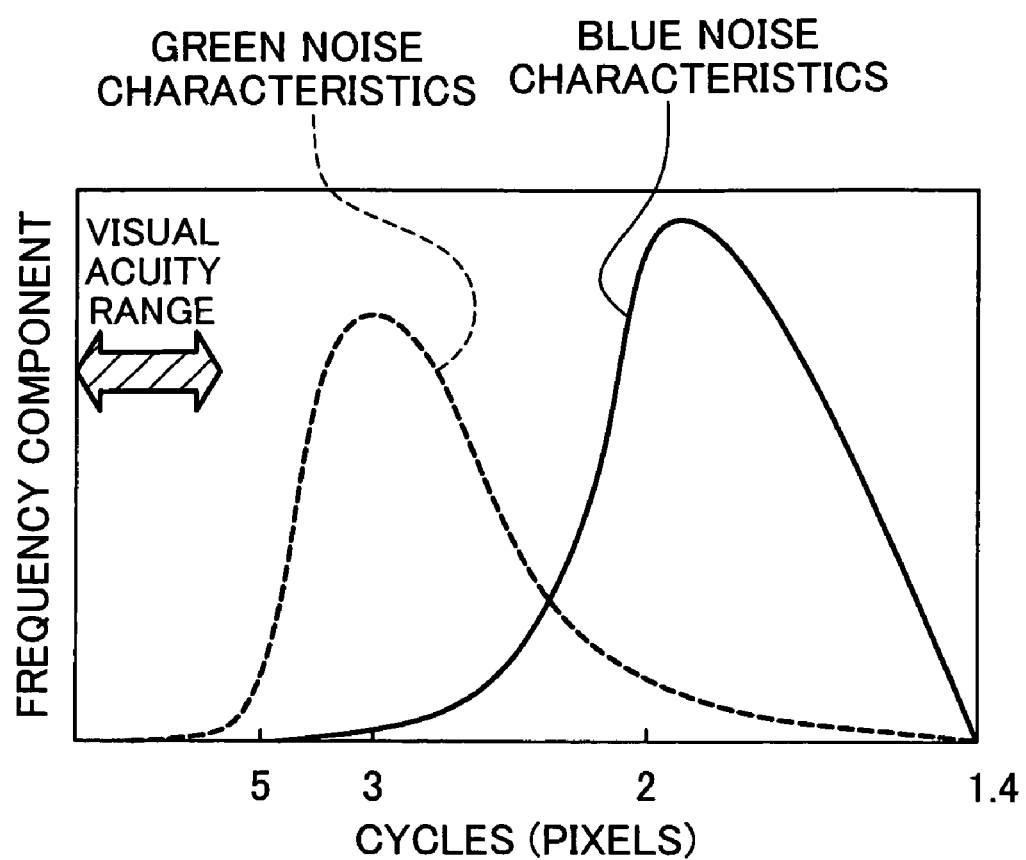
FIG. 8 shows an illustration depicting conceptually exemplary spatial frequency characteristics of threshold values established at pixels in a blue noise dither matrix having blue noise characteristics.

FIG. 8 is an illustration depicting conceptually exemplary spatial frequency characteristics of threshold values established at pixels in a blue noise dither matrix having blue noise characteristics, by way of a simple example of adjustment of dither matrix. The spatial frequency characteristics of a blue noise dither matrix are characteristics such that the length of one cycle has the largest frequency component in a high frequency region of close to two pixels. These spatial frequency characteristics have been established in consideration of the characteristics of human visual perception. Specifically, a blue noise dither matrix is a dither matrix in which, in consideration of the fact that human visual acuity is low in the high frequency region, the storage locations of threshold values have been adjusted in such a way that the largest frequency component is produced in the high frequency region.

FIG. 8 also shows exemplary spatial frequency characteristics of a green noise matrix, indicated by the broken line curve. As illustrated in the drawing, the spatial frequency characteristics of a green noise dither matrix are characteristics such that the length of one cycle has the largest frequency component in an intermediate frequency region of from two to ten or so pixels. Since the threshold values of a green noise dither matrix are established so as to produce these sorts of spatial frequency characteristics, if dot on/off states of pixels are decided while looking up in a dither matrix having green noise characteristics, dots will be formed adjacently in units of several dots, while at the same time the clusters of dots will be formed in a dispersed pattern overall. For printers such as laser printers, with which it is difficult to consistently form fine dots of about one pixel, by means of deciding dot on/off states of pixels through lookup in such a green noise matrix it will be possible to suppress formation of "orphan" dots. As a result, it will be possible to output images of consistently high quality at high speed. In other words, a dither matrix adapted for lookup to decide dot on/off states in a laser printer or similar printer will contain threshold values adjusted so as to have green noise characteristics.

Figure 9:
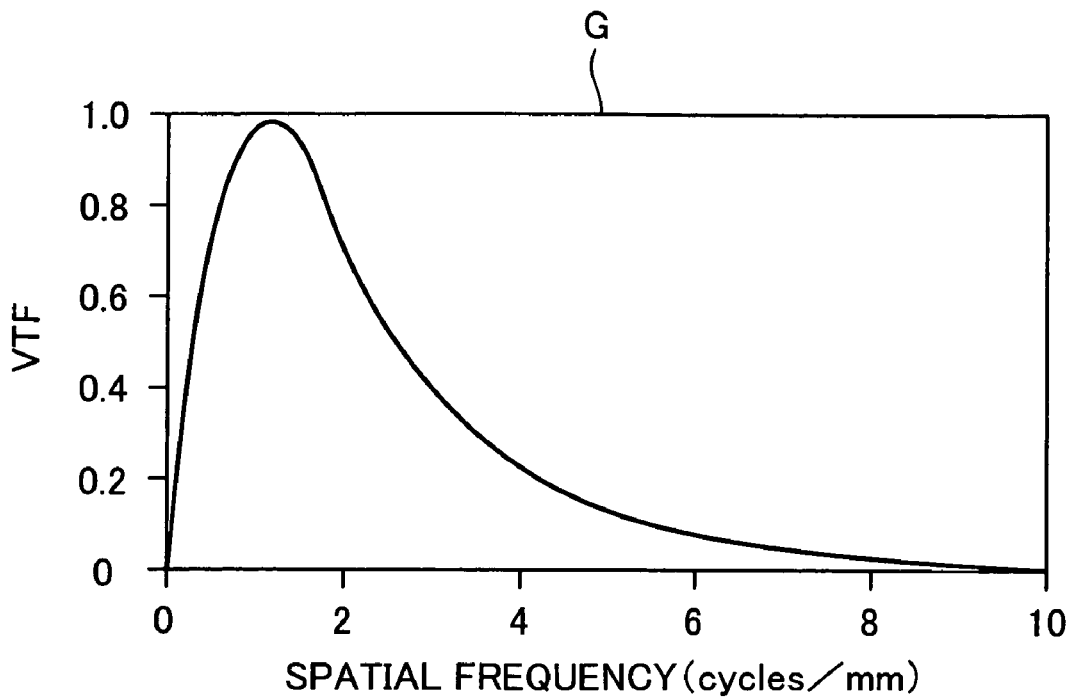
FIG. 9 shows a conceptual illustration of a visual spatial frequency characteristic VTF (Visual Transfer Function) representing acuity of the human visual faculty with respect to spatial frequency.

FIG. 9 is a conceptual illustration of a visual spatial frequency characteristic VTF (Visual Transfer Function) representing human visual acuity with respect to spatial frequency. Through the use of a visual spatial frequency characteristic VTF it will be possible to quantify the perception of graininess of dots apparent to the human visual faculty following the halftone process, by means of modeling human visual acuity using a transfer function known as a visual spatial frequency characteristic VTF. A value quantified in this manner is referred to as a graininess index. The formula F1 gives a typical experimental equation representing a visual spatial frequency characteristic VTF. In the formula F1 the variable L represents observer distance, and the variable u represents spatial frequency. The formula F2 gives an equation defining a graininess index. In the formula F2 the coefficient K is a coefficient for matching derived values with human acuity.

Such quantification of graininess perception by the human visual faculty makes possible fine-tuned optimization of a dither matrix for the human visual system. Specifically, a Fourier transform can be performed on a dot pattern hypothesized when input tone values have been input to a dither matrix, to arrive at a power spectrum FS; and a graininess evaluation value that can be derived by integrating all input tone values after multiplying the power spectrum FS with the visual spatial frequency characteristic VTF (the formula F2) can be utilized as a evaluation coefficient for the dither matrix. In this example, the aim is to achieve optimization by adjusting threshold value storage locations to minimize the dither matrix evaluation coefficient.

The halftone process in embodiments of the present invention converts a common dither matrix that is generated by each method of the following embodiments described below, and employs each dither matrix thus converted to reduce the number of dither matrices used in the halftone process, thereby realizes reduced burden of processing by the printing system, reduced burden on hardware resources, and the like.

Figure 10:
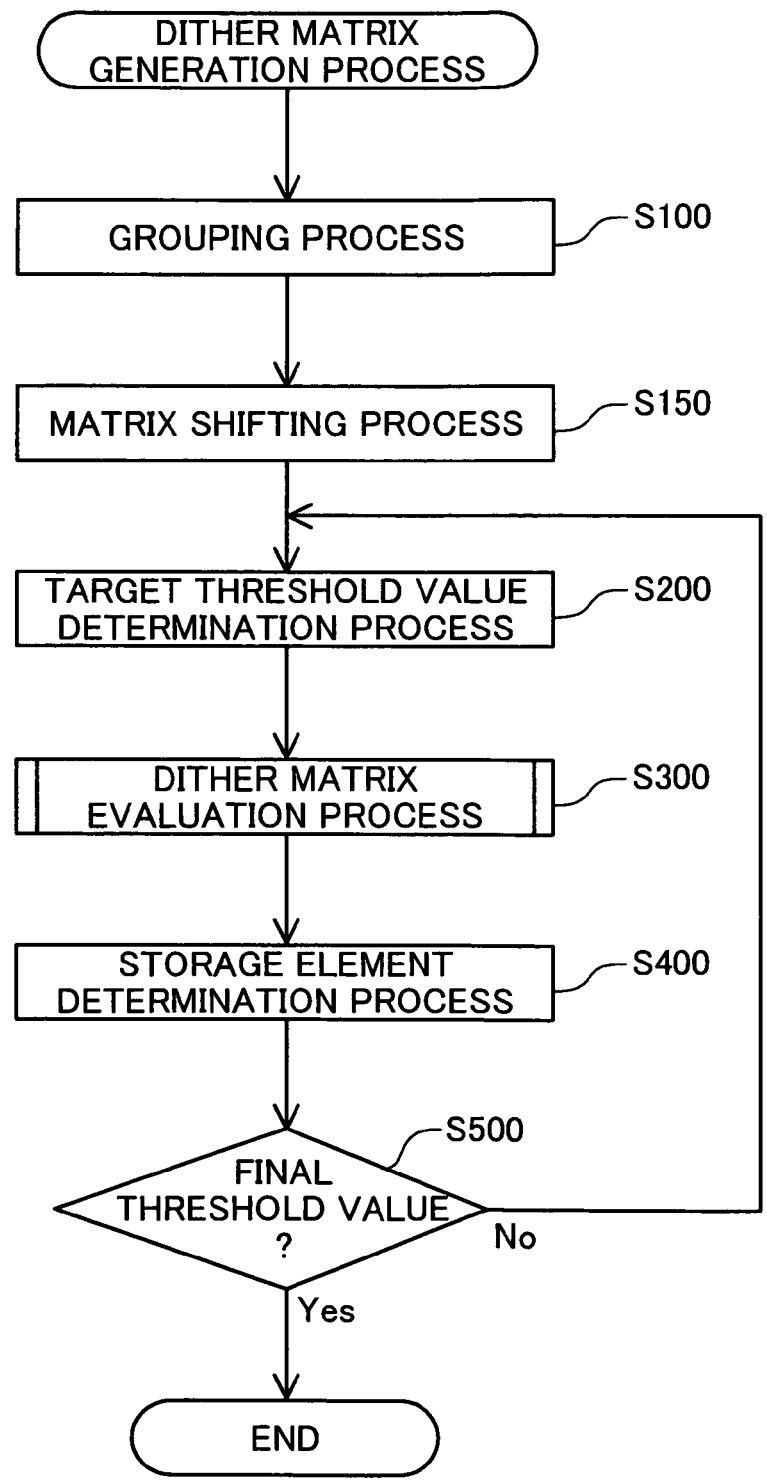
FIG. 10 shows a flowchart showing the processing routine of the dither matrix generation method in the first embodiment.

C. Method of Dither Matrix Generation in the First Embodiment of the Present Invention:

FIG. 10 is a flowchart showing the processing routine of a method of dither matrix generation in a first embodiment of the present invention. In the method of generation of the first embodiment, it is configured such that optimization is performed in consideration of dispersibility of dots formed by successive main scans (passes) in the course of print image formation. In this example, a small dither matrix of 8 rows and 8 columns is generated for ease of explanation. A graininess index (Formula F2, FIG. 9) is used as an evaluation for representing optimality of a dither matrix.

In step S100, a grouping process is performed. In this embodiment, the grouping process is a process of dividing a dither matrix into groups of elements respectively corresponding to a plurality of pixel groups, for each of which dots are formed by a same main scan in the course of print image formation (FIG. 4).

FIG. 11 is an illustration showing a dither matrix Mc that has undergone the grouping process in the first embodiment of the present embodiment. In this grouping process, the matrix is divided into four pixel groups in FIG. 4. Each number marked on each element of the initial dither matrix M0 indicates the pixel group to which the element belongs. For example, an element in the first row of the first column belongs to a first pixel group (FIG. 4), and an element in the second row of the first column belongs to a second pixel group.

FIG. 12 is an illustration depicting four divided matrices M1-M4 in the first embodiment of the present invention. The divided matrix M1 is composed of: a plurality of elements that correspond to pixels belonging to the first pixel group, among the elements of an initial dither matrix M0; and blank elements i.e. a plurality of elements in blank. The blank element is an element in which no dot is formed irrespective of input tone value. The divided matrices M2, M3, and M4 are respectively composed of: a plurality of elements that correspond to pixels belonging to the second, third, and fourth pixel groups, among the elements of the initial dither matrix M0; and blank elements.

Once the grouping process of step S100 (FIG. 12) is thus complete, the control of the process is passed to step S150.

In step 150, a matrix shifting process is performed. The matrix shifting process is a process of shifting and placing a dither matrix into the same state as the state used in the halftone process described above (FIG. 7).

Figure 13:
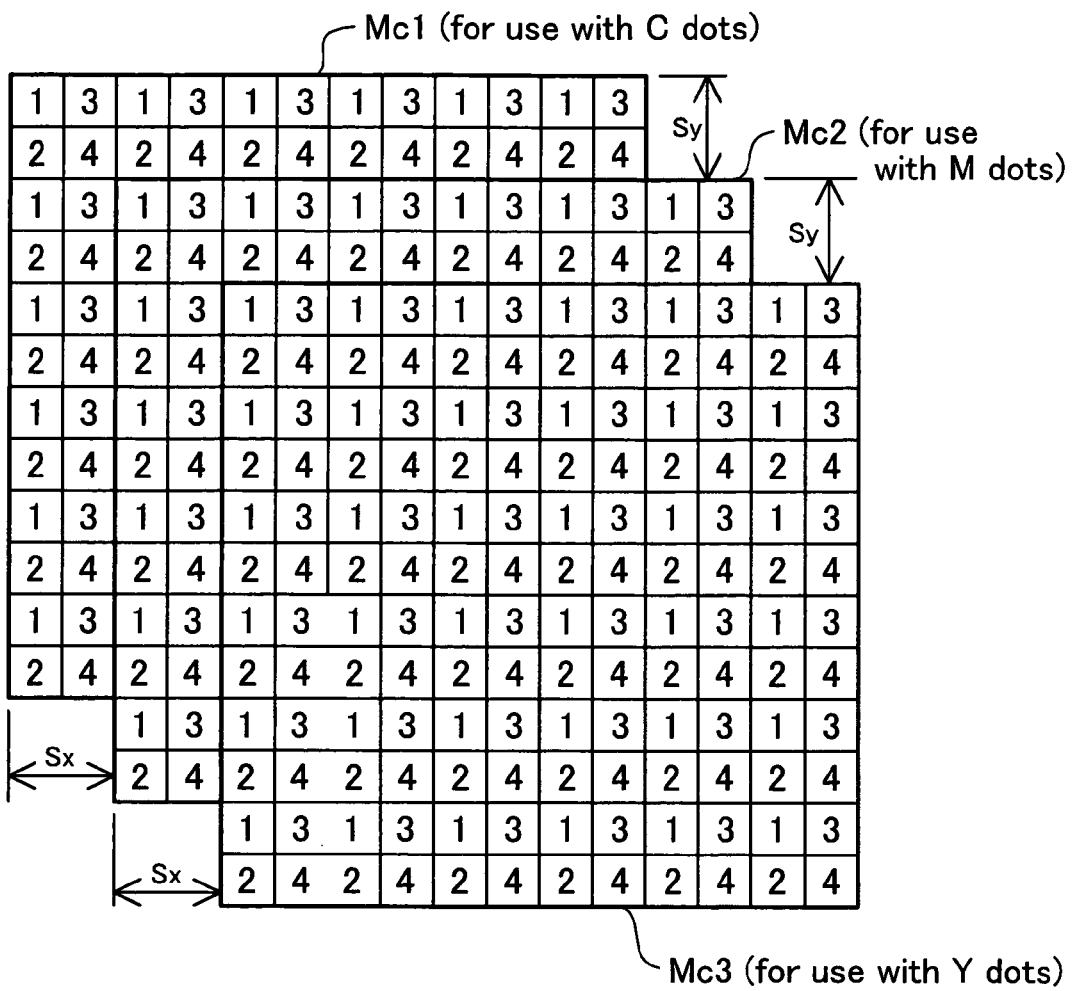
FIG. 13 is an illustration showing the contents of a matrix shifting process in the first embodiment.

FIG. 13 is an illustration showing the contents of the matrix shifting process in the first embodiment of the present invention. In the matrix shifting process of the first embodiment, a single common dither matrix Mc is generated which is used in the halftone process on cyan dots, magenta dots, and yellow dots. When placed at a predetermined position, the common dither matrix Mc is used for determination of state of cyan dot formation as a dither matrix Mc1. Meanwhile, the common dither matrix Mc is shifted from the predetermined position in a predetermined manner, and is used for the halftone process as a dither matrix Mc2 for determination of state of magenta dot formation, as a dither matrix Mc3 for determination of state of yellow dot formation, and the like. The combination of the dither matrices Mc1, Mc2, Mc3 correspond to the dither matrix M of FIG. 1.

In the present embodiment, the shifting process is performed in such a way that makes the divided matrices M1 through M4 coincident with each other, for ease of explanation. In the example shown in the drawing, the shifting is of Sx (two pixels) in the mains scanning direction and of Sy (two pixels) in the sub-scanning direction. Note that such shifting not necessarily have the same shift amount in both the main scanning and sub-scanning directions, but may also be performed only in either one of the directions. Furthermore, the shifting not only include translational transfer, but may also include rotational transfer. Note that performing the shifting in such a way that makes the divided matrices M1 through M4 coincident with each other has an advantage that the burden on the process of dither matrix generation can be reduced. Note that the shift amount corresponds to "predetermined unit shift amount" in the scope of claim for patent.

Once the matrix shifting process of step S150 (FIG. 13) is thus complete, the control of the process is passed to step S200.

In step S200, a target threshold value determination process is performed. The target threshold value determination process is a process of determining a threshold value that is targeted for determination of storage element. In the present embodiment, the determination of threshold value is performed by selecting threshold values in ascending order, i.e. in order of decreasing tendency to dot formation. Selecting threshold values in order of decreasing tendency to dot formation allows threshold values to have its storage elements determined in order of decreasing conspicuity of dot graininess i.e. decreasing level of highlight of areas for which the threshold values are used to control dot arrangements. It is thus possible to provide greater degrees of design freedom to highlight areas having conspicuous dot graininess. In this example, four threshold values are already determined and a fifth threshold value is now to be determined, as will be described below.

Figure 14:
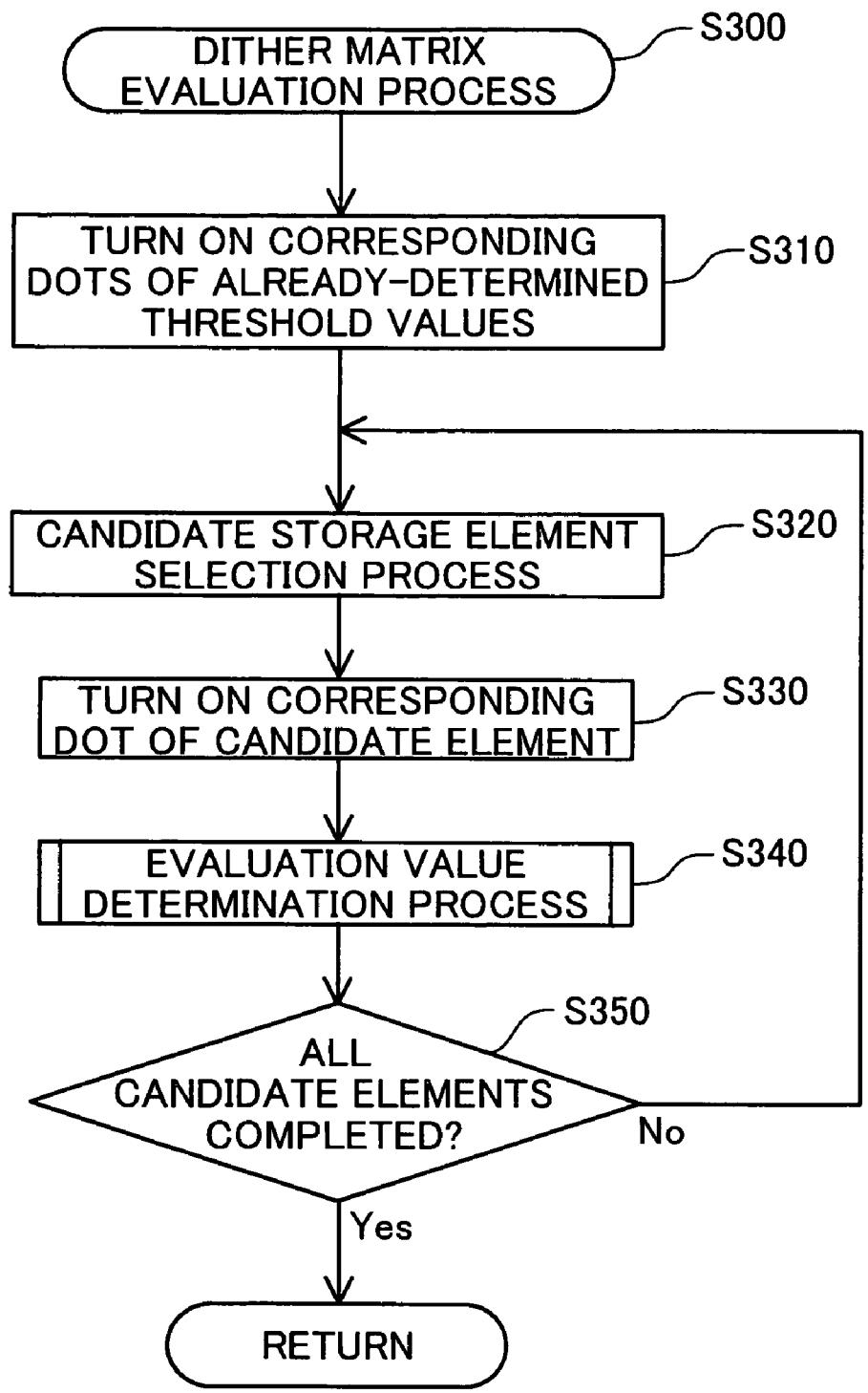
FIG. 14 shows a flowchart showing the processing routine of a dither matrix evaluation process in the first embodiment.

FIG. 14 is a flowchart showing the processing routine of a dither matrix evaluation process in the first embodiment of the present invention. In step S310, each dot that corresponds to an already determined threshold value is made on. The already determined threshold value indicates a threshold value for which a storage element is determined. In the present embodiment, since threshold values are selected in order of decreasing tendency to dot formation as described above, at the time of dot formation in association with a target threshold value, all pixels that correspond to elements storing already determined threshold values will have dots formed thereon. To the contrary, in case where the input tone value is a minimum value that allows for dot formation in association with the target threshold value, any pixel that corresponds to an element other than those storing already determined threshold values will not have a dot formed thereon.

Figure 15:
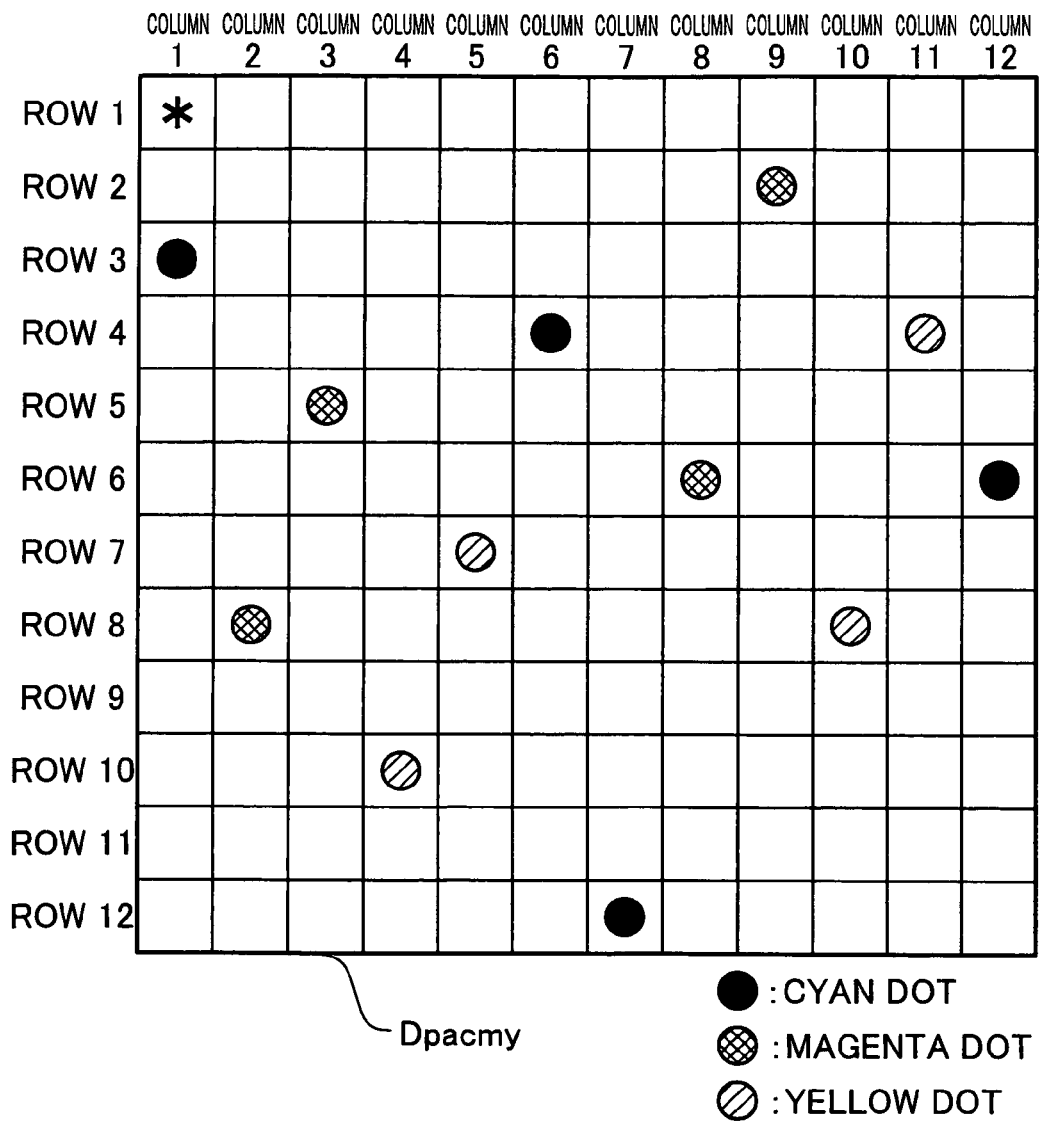
FIG. 15 is an illustration showing a situation in which dots are formed on each of three colors of pixels that correspond to elements of a common dither matrix Mca in which four threshold values associated with first to fourth greatest tendency to dot formation are stored.

FIG. 15 is an illustration showing a situation in which dots are formed on each of three colors of pixels that correspond to elements of the common dither matrix Mc in which four threshold values associated with first to fourth greatest tendency to dot formation are stored. A dot pattern Dpacmy thus configured is used to determine on which pixel a fifth dot is to be formed. The mark "*" will be described later.

In the example of FIG. 15, these four threshold values are stored in storage elements in the third row of the first column, the fourth row of the sixth column, the sixth row of the twelfth column, and the twelfth row of the seventh column. Given the rows and columns of the dither matrix Mc1 (FIG. 14) are coincident with pixel positions, four cyan dots are formed at pixel positions in the third row of the first column, the fourth row of the sixth column, the sixth row of the twelfth column, and the twelfth row of the seventh column, respectively. Four magenta dots are formed at pixel positions shifted by two rows and two columns from those of the cyan dots, that is, at pixel positions in the fifth row of the third column, the sixth row of the eighth column, the eighth row of the second column, and the second row of the ninth column, respectively. Four yellow dots are formed at pixel positions shifted by four rows and four columns from those of the cyan dots, that is, at pixel positions in the seventh row of the fifth column, the eighth row of the tenth column, the tenth row of the fourth column, and the fourth row of the eleventh column, respectively.

In step S320 (FIG. 14), a candidate storage element selection process is performed. The candidate storage element selection process is a process of selecting a candidate storage element for storing a threshold value, out of the elements of the divided matrix M1 that is selected as an evaluation matrix. In this example, a storage element that is in the first row of the first column and is indicated by the mark "*" is selected as the candidate storage element.

As for the selection of candidate storage element, every storage element other than the four storage elements already determined as elements for storing threshold values of the common dither matrix Mc may be selected in sequence, or alternatively, any element not adjacent to the already determined elements may be selected preferentially as long as such an element exists.

In step S330 (FIG. 14), it is assumed that a dot is made on in association with the selected candidate storage element. Specifically, dots are made on in association with the storage elements in the first row of the first column, the third row of the third column, and the fifth row of the fifth column. This is because the threshold value stored in the candidate storage element is not only used in the halftone process for a cyan dot at the pixel position in the first row of the first column, but is also used in the halftone process for a magenta dot at the pixel position in the third row of the third column, which is the pixel position shifted by two pixels in each of the main scanning and sub-scanning directions, and is further used in the halftone process for a yellow dot at the pixel position in the fifth row of the fifth column. This allows for evaluation of the common dither matrix Mc in association with the time when the threshold value associated with the fifth greatest tendency to dot formation is stored in the candidate storage element.

FIG. 16 is an illustration depicting a dot density matrix Ddacmy that corresponds to an evaluation dot pattern Dpacmy (FIG. 15). In the dot density matrix Ddacmy, the numeral "1" indicates a dot has been formed (including the case where a dot is supposed to be formed in the pixel that corresponds to the candidate storage element); whereas the numeral "0" indicates no dot has been formed. In this way, in consideration of how the common dither matrix Mc is used in the halftone process, state of dot formation is determined for all of cyan, magenta, and yellow dots on the basis of the determination of a storage element for storing one threshold value. It is therefore possible to evaluate optimality of the position for storing the threshold value, which is definitive of the state of dot formation for each dot color, all at the same time.

Figure 17:
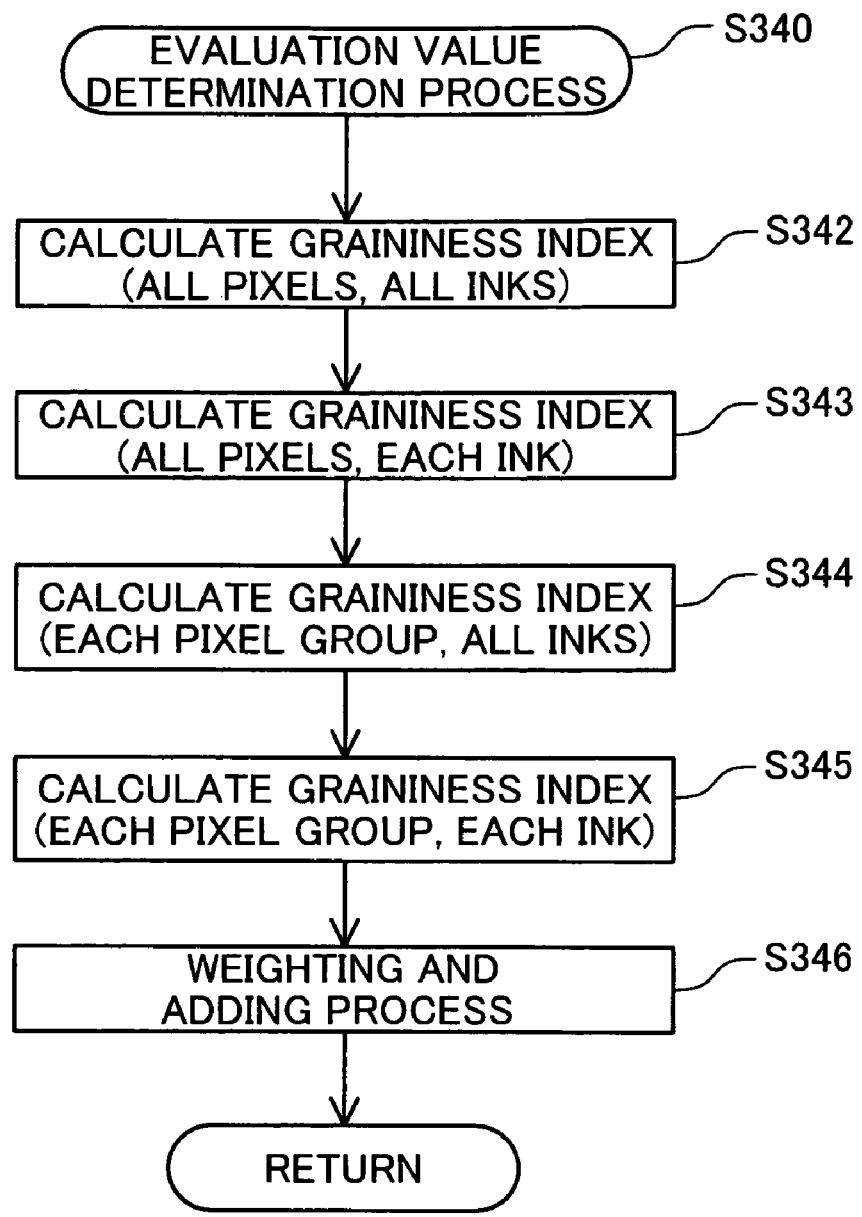
FIG. 17 is a flowchart showing the processing routine of an evaluation value determination process in the first embodiment.

FIG. 17 is a flowchart showing the processing routine of an evaluation value determination process in the first embodiment of the present invention. In step S342, a graininess index is calculated with respect to all pixels by employing all colors as the target of evaluation. Specifically, a graininess index is calculated by using Formula F2 (FIG. 9), based on the dot density matrix Ddacmy (FIG. 16).

In step S343, graininess indices are calculated with respect to all pixels by employing respective inks as the target of evaluation. Specifically, graininess indices are calculated in a similar way as above, by using Formula F2, based on a dot density matrix Ddac (FIG. 18) obtained by extracting only cyan dots from the dot density matrix Ddacmy (FIG. 16), a dot density matrix Ddam (FIG. 19) obtained by extracting only magenta dots from the dot density matrix Ddacmy, and a dot density matrix (not shown) obtained by extracting only yellow dots from the dot density matrix Ddacmy, respectively.

In step S344, graininess indices are calculated with respect to respective pixel groups (FIG. 12) by employing all inks as the target of evaluation. Specifically, graininess indices are calculated in a similar way as above, by using Formula F2, based on a dot density matrix Dd1cmy (FIG. 20) obtained by extracting only the first pixel group from the dot density matrix Ddacmy (FIG. 16), a dot density matrix Dd2cmy (FIG. 21) obtained by extracting only the second pixel group from the dot density matrix Ddacmy, a dot density matrix (not shown) obtained by extracting only the third pixel group from the dot density matrix Ddacmy, and a dot density matrix (not shown) obtained by extracting only the fourth pixel group from the dot density matrix Ddacmy, respectively.

In step S345, graininess indices are calculated with respect to the respective pixel groups (FIG. 12) by employing the respective inks as the target of evaluation. Specifically, each graininess index is calculated in a similar way as above, by using Formula F2, based on each dot density matrix obtained by extracting only those dots of each color and each pixel group from the dot density matrix Ddacmy (FIG. 16). Examples of such dot density matrix include a dot density matrix Dd1c (FIG. 22) obtained by extracting only cyan dots of the first pixel group from the dot density matrix Ddacmy (FIG. 16) and a dot density matrix D1m (FIG. 23) obtained by extracting only magenta dots of the first pixel group from the dot density matrix Ddacmy (FIG. 16).

In step S346, a weighting and adding process is performed. The weighting and adding process is a process of assigning weights to the respective calculated graininess indices and then adding them together.

FIG. 24 is an illustration showing a calculation formula for use in the weighting and adding process. As can be seen from the calculation formula, an evaluation value E is determined as a sum of: a value obtained by multiplying the graininess index Gacmy of all inks and of with respect to all pixels (calculated in step S342) by a weighting coefficient W1 (12, for example); values obtained by multiplying respective graininess indices Gac, Gam, Gay of the respective inks and of with respect to all pixels (calculated in step S342) by a weighting coefficient W2 (four, for example); a value obtained by multiplying a sum of four graininess indices G1cmy, G2cmy, G3cmy, G4cmy of all inks and of with respect to the respective first through fourth pixel groups (calculated in step S344) by a weighting coefficient W3 (three, for example); and a value obtained by multiplying a sum of 12 graininess indices G1c through G4y of the respective inks and of with respect to the respective first through fourth pixel groups (calculated in step S345) by a weighting coefficient W4 (one, for example).

Such a series of processes (FIG. 14) from the candidate storage element selection process (step S320) to the evaluation value determination process (step S340) is performed for every candidate storage element (step S350). Once evaluation values are thus determined with respect to all candidate storage elements respectively, then the control of the process is passed to step S400 (FIG. 10).

In step S400, a storage element determination process is performed. In the storage element determination process, a candidate storage element that provides a minimum evaluation value is determined as the element for storing the target threshold value.

Such processes (step S200 through step 400) are repeated for every threshold value until a last threshold value is reached (step S500). The last threshold value may be a maximum threshold value associated with the least tendency to dot formation, or alternatively, the last threshold value may be a maximum threshold value within a predefined range of threshold values. This also applies to a threshold value that is initially targeted for evaluation.

As described above, in the first embodiment, it is assumed that the single common dither matrix Mc is shifted two times to perform the halftone process on each colors of inks i.e. cyan, magenta, and yellow, and at the same time, in the halftone process performed under such an assumption, a method is realized that improves overall dispersibility of the three colors of dots. The common dither matrix Mc thus generated provides an advantage that the number of dither matrices used in the halftone process can be reduced so that the burden of processing by the printing system and the burden on hardware resources can be reduced.

Note that the dot patterns targeted for evaluation are not restricted to those mentioned above, but may also be configured as follows by using a calculation formula of a modification (FIG. 25). That is to say, although in the first embodiment, a three-color mixed pattern of cyan, magenta, and yellow is used as the target of evaluation; however, it would also be acceptable to perform optimization by employing two-color mixed patterns that include one color (cyan in this example) as a reference, such as a two-color mixed pattern of cyan and magenta and a two-color mixed pattern of cyan and yellow, as the target of evaluation. This allows for more adequate setting of the reference matrix. The reason the reference matrix is set more adequately is that, with a color-mixed pattern of two colors within the halftone range, the problem of granularity in print images becomes more pronounced. To the contrary, in case of a color-mixed pattern of three colors, the evaluation becomes difficult due to excess number of dots.

Meanwhile, the reason a two-color mixed pattern of magenta and yellow is not used as the target of evaluation is that when the two-color mixed pattern of cyan and magenta is used as the target of evaluation, the two-color mixed pattern of magenta and yellow also becomes the target of evaluation at the same time. This is true because in the present embodiment, the dither matrix Mc1 used for determination of state of cyan dot formation and the dither matrix Mc2 used for determination of state of magenta dot formation have the same relationship as that between the dither matrix Mc2 and the dither matrix Mc3 used for determination of state of yellow dot formation, as can be seen from FIG. 13. Such a relative relationship is established because the dither matrices Mc1, Mc2, Mc3 are configured by repeatedly performing the same shifting process on the single common dither matrix Mc. Note that the phrase "repeatedly performing the same shifting process" can also be understood as each shifting process that is an integral multiple (one time and two times, in this example) of a predetermined unit shift amount.

Note that although such adjustment is not necessarily performed for every tone value, but it may be preferable if such adjustment is performed for every tone value included within a range of dot densities from 40% to 60%, where relatively more low-frequency components are included under the assumption that dots are uniformly arranged on a printing medium.

Figure 26:
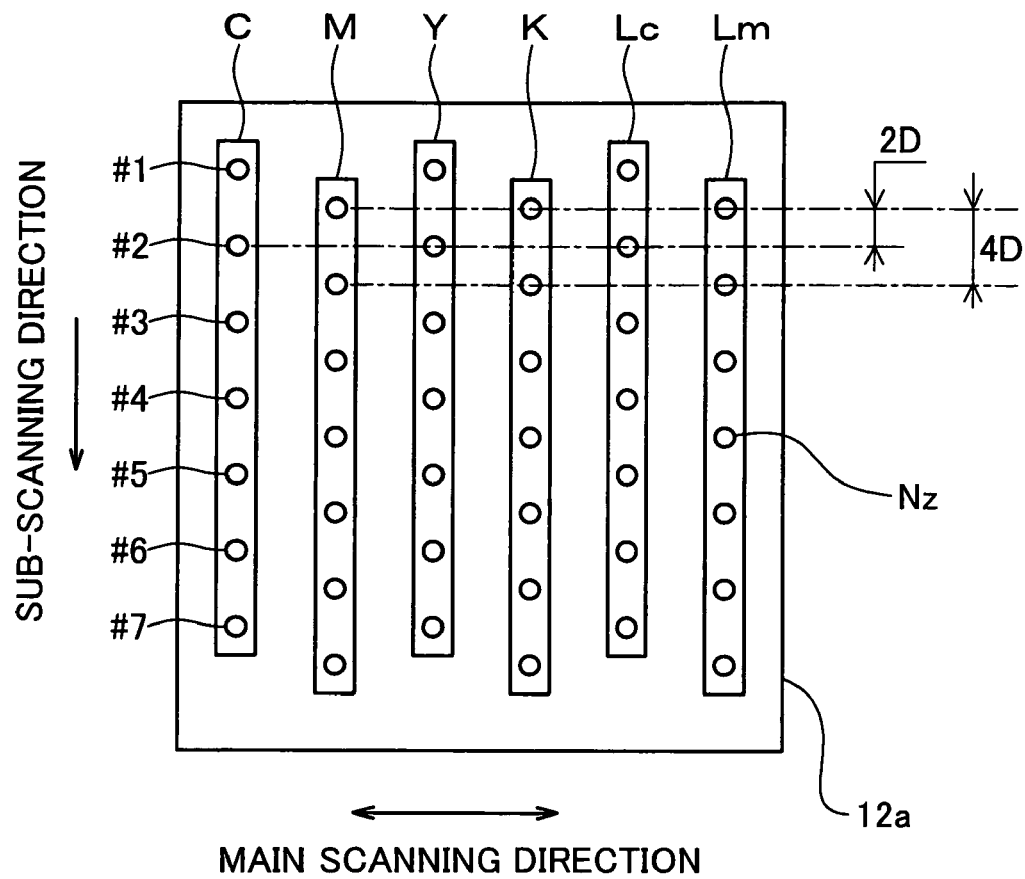
FIG. 26 is an illustration showing a nozzle arrangement on the lower face of a print head 12a of a second embodiment.

D. Method of Dither Matrix Generation in a Second Embodiment:

FIG. 26 is an illustration showing a nozzle arrangement on the lower face of a print head 12a of a second embodiment. On the lower face of the print head 12a, there are formed a cyan ink nozzle array C for ejecting cyan ink, a magenta ink nozzle array Mz for ejecting magenta ink, a yellow ink nozzle array Y for ejecting yellow ink, a black ink nozzle array for ejecting black ink, light cyan ink nozzle array Lc for ejecting light cyan ink, and a light magenta ink nozzle array Lm for ejecting light magenta ink.

A plurality of nozzles contained in each nozzle array are lined up at a constant nozzle pitch 4\*D in the sub-scanning direction, respectively. As can be seen from FIG. 26, the respective nozzles Nz of the cyan ink nozzle array C, yellow ink nozzle array Y, and light cyan ink nozzle array Lc are arranged at the same sub-scan positions. The group composed of these three nozzle arrays is referred to as a first nozzle array group in the present specification. On the other hand, the respective nozzles Nz of the magenta ink nozzle array Mz, black ink nozzle array K, and light magenta ink nozzle array Lm are also arranged at the same sub-scan positions. The group composed of these three nozzle arrays is referred to as a second nozzle array group in the present specification. The first nozzle array group and the second nozzle array group are arranged in a zigzag alignment with respect to each other. Such a zigzag alignment causes the first nozzle array group and the second nozzle array group to form dots at positions separated by two pixels from each other in the sub-scanning direction, in a same main scan. This restrains the dots from coming into contact with each other. Note that the zigzag alignment is not restricted to of two columns, but may also be of three columns or more.

As described above, the nozzle pitch and the number of ejectable ink colors of the print head 12*a* are different from those of the print head 12 of the first embodiment. Difference in nozzle pitch leads to different pixels targeted for dot formation in each main scan, which in turn results in difference in pixel group as compared with the first embodiment. On the other hand, difference in the number of ejectable ink colors results in different dither matrices targeted for evaluation as compared with the first embodiment. As a result of such differences, a process of dither matrix generation in the second embodiment have different grouping process (step S100, FIG. 10), matrix shifting process (step S150, FIG. 10), and evaluation value determination process (step S340, FIG. 17, FIG. 14, FIG. 10) as compared with the process in dither matrix generation of the first embodiment.

D-1. Grouping Process in the Second Embodiment (Step S100, FIG. 10)

Figure 27:
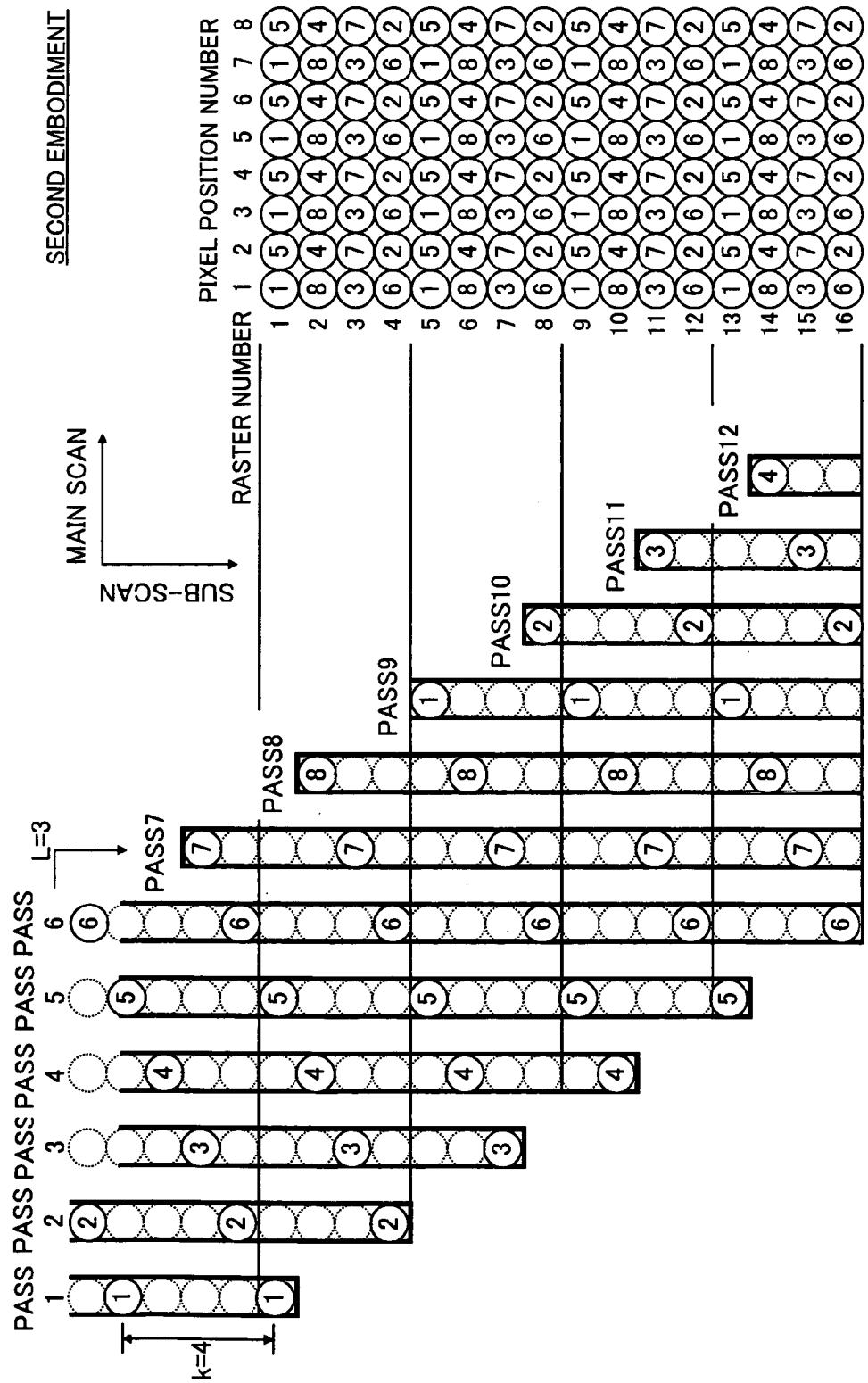
FIG. 27 is an illustration showing how printing is performed by an overlap recording mode in the second embodiment of the present invention.

FIG. 27 is an illustration showing how printing is performed by an overlap recording mode in the second embodiment of the present invention. In FIG. 27, solid circles with numerals contained therein indicate positions of six nozzles in the sub-scanning direction in each pass. The numerals 1 through 8 in the solid circles are remainders of pass numbers when divided by eight. Note that, for ease of explanation, the numeral "8" is used instead of "0" when the remainder is "8". The pixel position numbers indicate the sequence of pixel alignment on each raster line. Note that the recording mode is a mode of recording with respect to the first nozzle group.

The so-called overlap recording mode is a mode of recording in which each raster line is formed by a plurality of passes. In this embodiment, each raster line is formed by two passes. Specifically, a raster line of raster number 1 is formed by pass 1 and pass 5; whereas raster lines of raster numbers 2, 3 are formed by pass 8 and pass 4, and pass 3 and pass 7, respectively.

As can be seen from FIG. 27, a dot pattern composed of raster lines of raster numbers 1 through 4 is formed by eight passes 1 through 8; whereas a dot pattern composed of raster lines of raster numbers 5 through 8 is formed by eight passes 3 through 10. Furthermore, when focusing attention on remainders of pass numbers when divided by eight, it turns out that the entire dot pattern is formed by repetition of a dot pattern that is composed of dots formed on pixels of raster numbers 1 through 4 and pixel position numbers 1 through 4.

Figure 28:
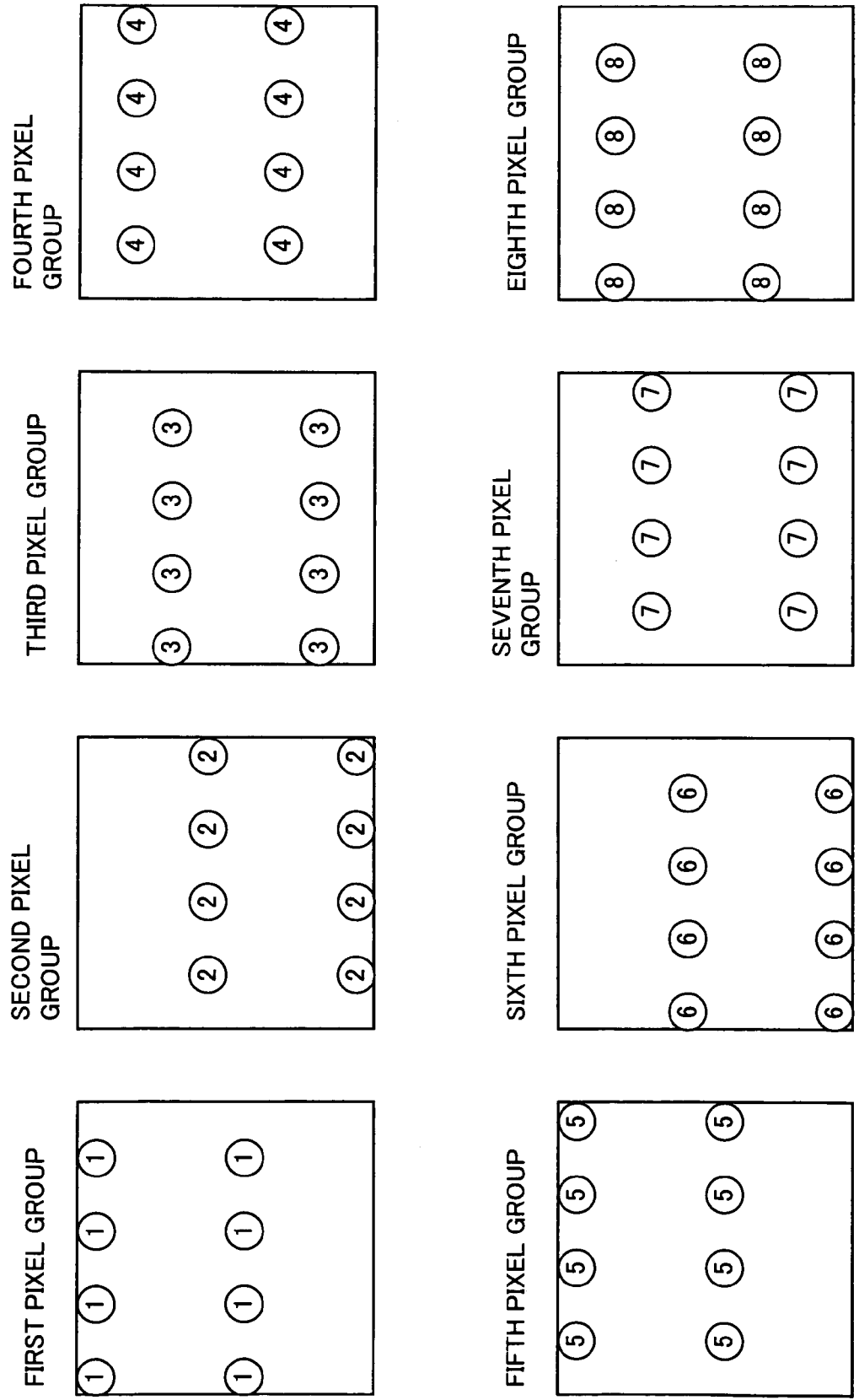
FIG. 28 is an illustration showing eight pixel groups that are obtained by dividing according to remainders of pass numbers when divided by eight.

FIG. 28 is an illustration showing eight pixel groups that are obtained by dividing according to remainders of pass numbers when divided by eight. In FIG. 28, each square represents an image area that is composed of pixels of pixel position numbers 1 through 8 among the raster lines of raster numbers 1 through 8. This image area corresponds to "common print area" in the scope of claim for patent and is configured by combining together the print pixels belonging to each of the eight pixel groups.

Even in such case, the same phenomenon may be occurred as in the case where positions of dots formed by each pass are deviated from each other. It is therefore possible to improve image quality by performing the same processing as in the embodiments described above, in such a way that causes dots formed in each of the eight pixel groups to have a predetermined characteristic.

As described above, in the process of dither matrix generation of the second embodiment, the process of grouping into first through eighth groups (FIG. 28) may be executed instead of the process of grouping into first through fourth groups (FIG. 4 and FIG. 12), in the grouping process (step S100) of the process of dither matrix generation of the first embodiment (FIG. 10 and FIG. 14).

Note that the grouping process described above is for the first nozzle group C, Y, Lc and that a grouping process for the second nozzle group Mz, K, Lm is dealt with such a pixel group that is shifted by two pixels in the sub-scanning direction. Specifically, in case where the first nozzle group C, Y, Lc corresponds to the first pixel group, the second nozzle group Mz, K, Lm corresponds to the third nozzle group; whereas in case where the first nozzle group C, Y, Lc corresponds to the second, third, fourth, fifth, sixth, seventh, and eighth pixel groups, the second nozzle group Mz, K, Lm corresponds to the fourth, first, second, seventh, eighth, fifth, and sixth pixel groups, respectively.

D-2. Matrix Shifting Process of the Second Embodiment (Step S150, FIG. 10)

Figures 29, 30:
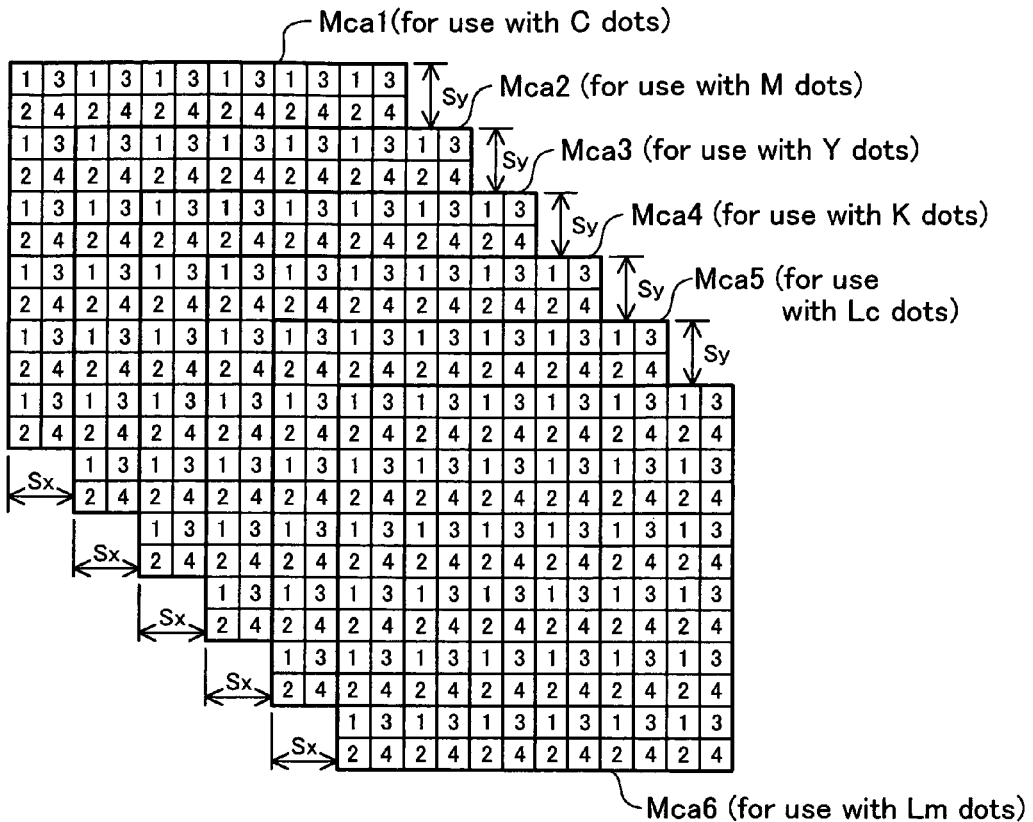
FIG. 29 is an illustration showing the contents of a matrix shifting process in the second embodiment of the present invention.
FIG. 30 is an illustration showing the property of the common dither matrix Mca of the second embodiment of the present invention.

FIG. 29 is an illustration showing the contents of a matrix shifting process in the second embodiment of the present invention. In the matrix shifting process of the second embodiment, a dither matrix for use with cyan dot Mca1, dither matrix for use with magenta dot Mca2, dither matrix for use with yellow dot Mca3, dither matrix for use with black dot Mca4, dither matrix for use with light cyan dot Mca5, and dither matrix for use with light magenta dot. Mca6 are configured by repeatedly performing a predetermined shifting process on a single common dither matrix Mca. In this example, the predetermined shifting process consists of shifting of Sx (two pixels) in the main scanning direction and shifting of Sy (two pixels) in the sub-scanning direction, as in the first embodiment. However, note that in the second embodiment, it is not necessarily the case that all of these six dither matrices are targeted for evaluation, but there may also be the case that only four of them are targeted for evaluation in the process of dither matrix generation.

FIG. 30 is an illustration showing the property of the common dither matrix Mca of the second embodiment of the present invention. Each numeral in the table of FIG. 30 represents a number of times the predetermined shifting process is performed. As can be seen from FIG. 30, this common dither matrix Mca is configured such that a two-color mixed pattern is optimized in case where the shifting process is performed one time, two times, and four times. That is to say, the common dither matrix Mca is configured such that two colors of dots are restrained from coming into contact if the shifting process is performed such numbers of times. Such a relative relationship is established because the dither matrices Mca1 through Mca6 are configured by repeatedly performing the same shifting process on the single common dither matrix Mca, as described previously.

Here, the numbers of times of the shifting process are the Qth (Q is 0, 1, 2 in this example) power of 2. This is because the inventors found out that using dither matrices generated through such shifting process as the target of evaluation makes the effect of optimization especially prominent. This is because, according to experiments made by the inventors, it turned out that performing the optimization of dither matrices by using dither matrices respectively generated by performing the shifting process zero time and one time as the target of evaluation results in pronounced deterioration of characteristic between a dither matrix generated by performing the shifting process two times and each of the dither matrices generated by performing the shifting process zero time and one time. This is also because it turned out that performing the optimization of dither matrices by using dither matrices respectively generated by performing the shifting process zero time and two times as the target of evaluation results in pronounced deterioration of characteristic between a dither matrix generated by performing the shifting process four times and each of the dither matrices generated by performing the shifting process zero time and two times. The inventors of the present application found out that, the use of these dither matrices that are in such a relationship leading to the prominent deterioration as the target of evaluation provides for a prominent effect, especially in case where large numbers of dither matrices are generated.

For example, with respect to cyan dots, for which dot on/off states are determined by using the dither matrix Mca1 that is set by placing the common dither matrix Mca at a reference position, it is configured such that the dots are restrained from coming into contact with magenta dots, yellow dots, and light cyan dots. Furthermore, with respect to magenta dots, for which dot on/off states are determined by using the dither matrix Mca2 that is set by shifting the common dither matrix Mca one time from the reference position, it is configured such that the dots are restrained from coming into contact with yellow dots, black dots and light magenta dots. As above, the common dither matrix Mca of the second embodiment is configured such that dots are restrained from coming into contact with each other when the numbers of times of the shifting process are relatively one, two, and four.

Furthermore, the common dither matrix Mca is configured such that two colors of dot groups within each of the first nozzle array group and the second nozzle array group are restrained from coming into contact with each other. The cyan ink nozzle array C, the yellow ink nozzle array Y, and the light cyan ink nozzle array Lc belonging to the first nozzle array group are in such a relationship subjected to the shifting process two times or four times with respect to each other. On the other hand, the magenta ink nozzle array Mz, the black ink nozzle array K, and the light magenta ink nozzle array Lm are also in such a relationship subjected to the shifting process two times or four times with respect to each other.

As described above, the common dither matrix Mca can be generated by executing the same process as the process of dither matrix generation of the first embodiment (FIG. 10, FIG. 14, FIG. 17), by employing the dither matrix Mca1 (the number of times of the shifting process is zero), the dither matrix Mca2 (the number of times of the shifting process is one), the dither matrix Mca3 (the number of times of the shifting process is two), and the dither matrix Mca5 (the number of times of the shifting process is four) as the target of evaluation. Note that the combination of the dither matrices Mca1 through Mca6 corresponds to the dither matrix M of FIG. 1.

Note that the phrase "performing a predetermined conversion process (N−1) times on a reference matrix" represents performing each conversion process for generating N (six, in this example) dither matrices. In the example mentioned above, for example, the first dither matrix is the reference matrix, and the second through sixth dither matrices are generated by a predetermined conversion process for generation of the dither matrix Mca2 (the number of times of the shifting process is one), a predetermined conversion process for generation of the dither matrix Mca3 (the number of times of the shifting process is two), a predetermined conversion process for generation of the dither matrix Mca4 (the number of times of the shifting process is three), a predetermined conversion process for generation of the dither matrix Mca5 (the number of times of the shifting process is four), and a predetermined conversion process for generation of the dither matrix Mca6 (the number of times of the shifting process is five), respectively.

Additionally, in case where another dither matrix is separately prepared for K dots, the dither matrix Mca4 is not used. In this case, the phrase "performing a predetermined conversion process (N−1) times on a reference matrix" represents a conversion process for generating N (five, in this example) dither matrices. The first dither matrix is the reference matrix, and the second through sixth dither matrices are generated by a predetermined conversion process for generation of the dither matrix Mca2 (the number of times of the shifting process is one), a predetermined conversion process for generation of the dither matrix Mca3 (the number of times of the shifting process is two), a predetermined conversion process for generation of the dither matrix Mca5 (the number of times of the shifting process is four), and a predetermined conversion process for generation of the dither matrix Mca6 (the number of times of the shifting process is five), respectively. In this way, the numbers of times of the shifting process in "predetermined conversion process" for generation of dither matrix may be discontinuous. The separately prepared dither matrix for K dots may then be added to perform the halftone process with respect to six colors of inks.

Figure 31:
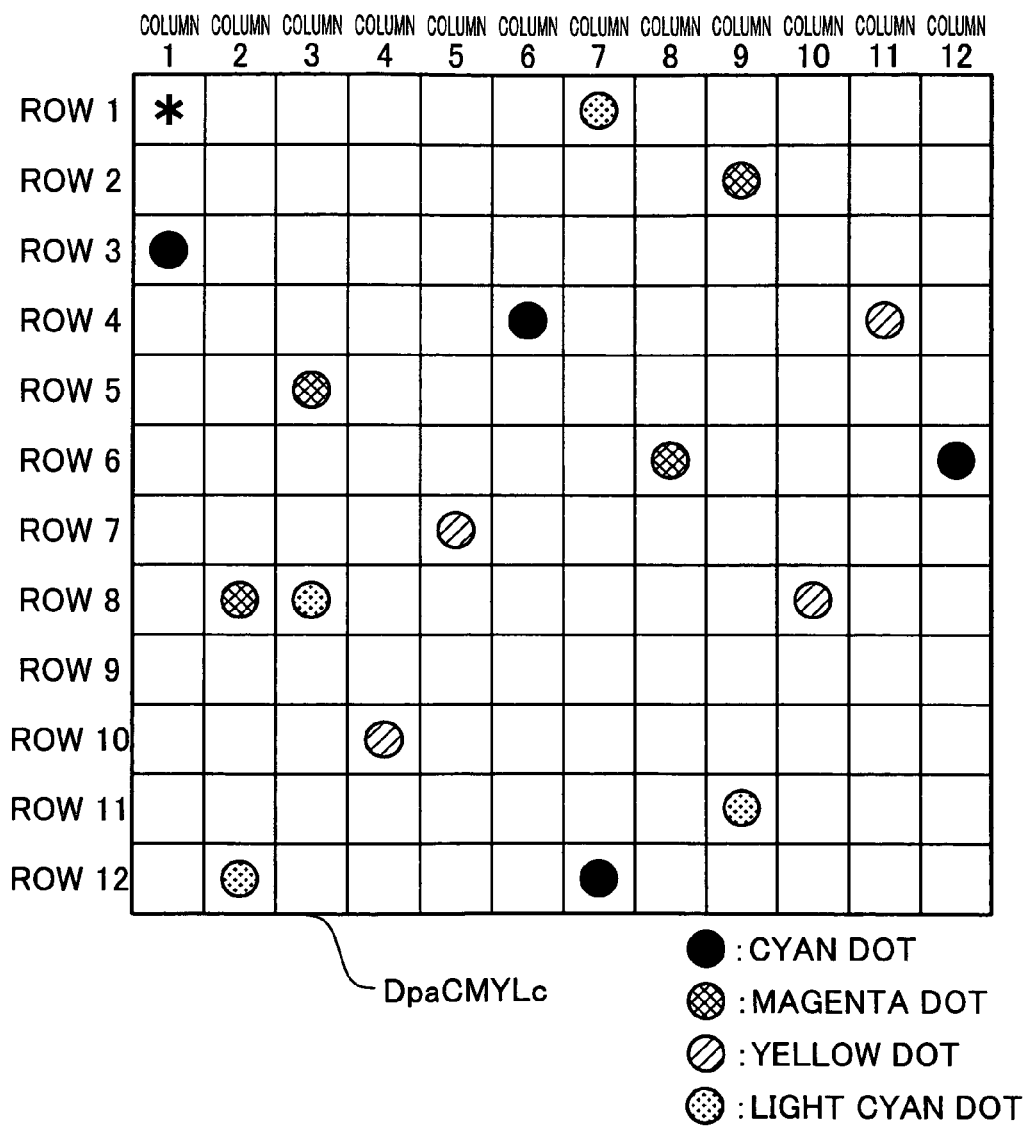
FIG. 31 is an illustration showing a situation in which dots are formed on each of three colors of pixels that correspond to elements of the common dither matrix Mca in which four threshold values associated with first to fourth greatest tendency to dot formation are stored.

D-3. Evaluation Value Determination Process of the Second Embodiment (Step S340, FIG. 17):

FIG. 31 is an illustration showing a situation in which dots are formed on each of three colors of pixels that correspond to elements of the common dither matrix Mca in which four threshold values associated with first to fourth greatest tendency to dot formation are stored. A dot pattern DpaCMYLc thus configured is used to determine on which pixel a fifth dot is to be formed.

In the example of FIG. 31, these four threshold values are stored in storage elements in the third row of the first column, the fourth row of the sixth column, the sixth row of the twelfth column, and the twelfth row of the seventh column, as in the first embodiment. Given the rows and columns of the dither matrix Mca1 (FIG. 29) are coincident with pixel positions, four cyan dots are formed at pixel positions in the third row of the first column, the fourth row of the sixth column, the sixth row of the twelfth column, and the twelfth row of the seventh column, respectively. Four magenta dots and four yellow dots are formed at pixel positions shifted by two rows and two columns and by four rows and four columns from those of the cyan dots, respectively, as in the first embodiment. However, in the second embodiment, four light cyan dots are further formed at pixel positions shifted by eight rows and eight columns from those of the cyan dots, that is, at pixel positions in the eleventh row of the ninth column, the twelfth row of the second column, the tenth row of the fourth column, and the eighth row of the third column, respectively.

FIG. 32 is an illustration showing a calculation formula for use in the weighting and adding process of the second embodiment. As can be seen from the calculation formula, an evaluation value E is determined as a sum of: a value obtained by multiplying a graininess index GacmyLc of all inks and of with respect to all pixels (calculated in step S342) by a weighting coefficient W1 (32, for example); values obtained by multiplying respective graininess indices Gac, Gam, Gay, GaLc of the respective inks and of with respect to all pixels (calculated in step S342) by a weighting coefficient W2 (eight, for example); a value obtained by multiplying a sum of eight graininess indices G1cmyLc through G8cmyLc of all inks and of with respect to the respective first through eighth pixel groups (calculated in step S344) by a weighting coefficient W3 (four, for example); and a value obtained by multiplying a sum of 32 graininess indices $G1c$ through $G8Lc$ of the respective inks and of with respect to the first through eighth pixel groups (calculated in step S345) by a weighting coefficient W4 (one, for example).

However, note that the graininess index G1cmyLc is generated based on a dot density matrix that is obtained by, with respect to cyan dots, yellow dots, and light cyan dots that are to be ejected from the first nozzle group, extracting dots from the first pixel group and by, with respect to magenta dots that are to be ejected from the second nozzle group, extracting dots from the third pixel group. On the other hand, the graininess index G1$m$, for example, is generated based on a dot density matrix obtained by extracting dots from the third pixel group, since the dots are to be ejected from the second nozzle group.

As described above, the second embodiment restrains mutual color mixture among the six nozzle arrays Mz, K, Lc, C, Y, Lm by making adjustments on dither matrices. Furthermore, the second embodiment also reduces the converted matrices used as the target of evaluation to those with especially high effects, i.e. to those obtained by shifting processes of the Qth (Q is 0, 1, 2 in this example) power of 2 of a unit shift amount, thereby effectively improving dispersibility of specific mixed patterns (those with relationships marked with circles in FIG. 30). This is because in the setting of dither matrix, the more the number of targets of evaluation, the less the degree of freedom available for the adjustment of each target of evaluation, and at the same time, the degree of deterioration of image quality due to contact among dot groups may also be different, so that image quality can be improved by assigning more degrees of design freedom to those dither matrices that are associated with dot groups with pronounced deterioration of image quality therebetween.

Furthermore, the second embodiment also reduces dispersibility of mixed patterns other than the specific mixed patterns (those with relationships not marked with circles in FIG. 30) by arranging the first nozzle array group and the second nozzle array group at positions shifted from each other. This is because, as a result of shifting, dots may be formed on different pixels from each other in a same main scan.

E. Modifications:

Although the present invention has been described above in terms of several embodiments, the present invention is not restricted to these embodiments, but may be implemented in various modes without departing from the scope of the present invention. For example, the present invention allows for optimization of dither matrix as described in the following modifications.

Figure 34:
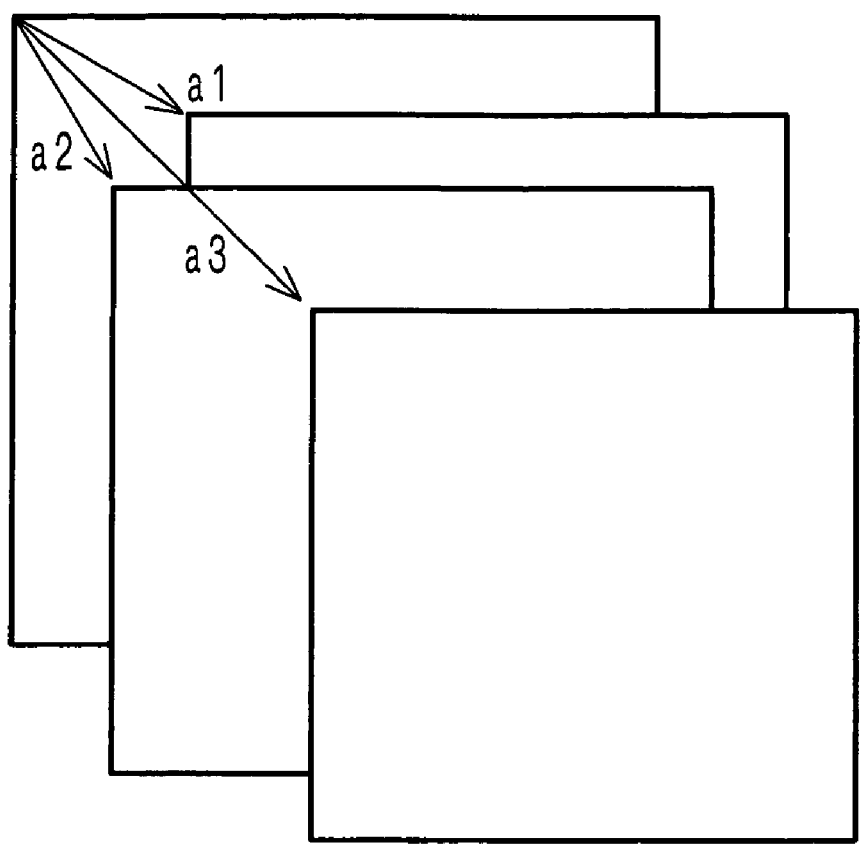
FIG. 34 is an illustration showing the contents of a matrix shifting process in a modification.

E-1. Although in the above embodiments, the shifting process is configured to make shifts by a same number of pixels in both the main scanning and sub-scanning directions; however, it may also be configured to make shifts in the main scanning direction only, as shown in FIG. 33. Furthermore, a plurality of shifting processes are not necessary required to make shifts in a same direction, but may also make shifts in different directions, as shown in FIG. 34. However, note that if making the same shift, there may be an advantage that relative relationships such as those described above can be obtained.

Figure 35:
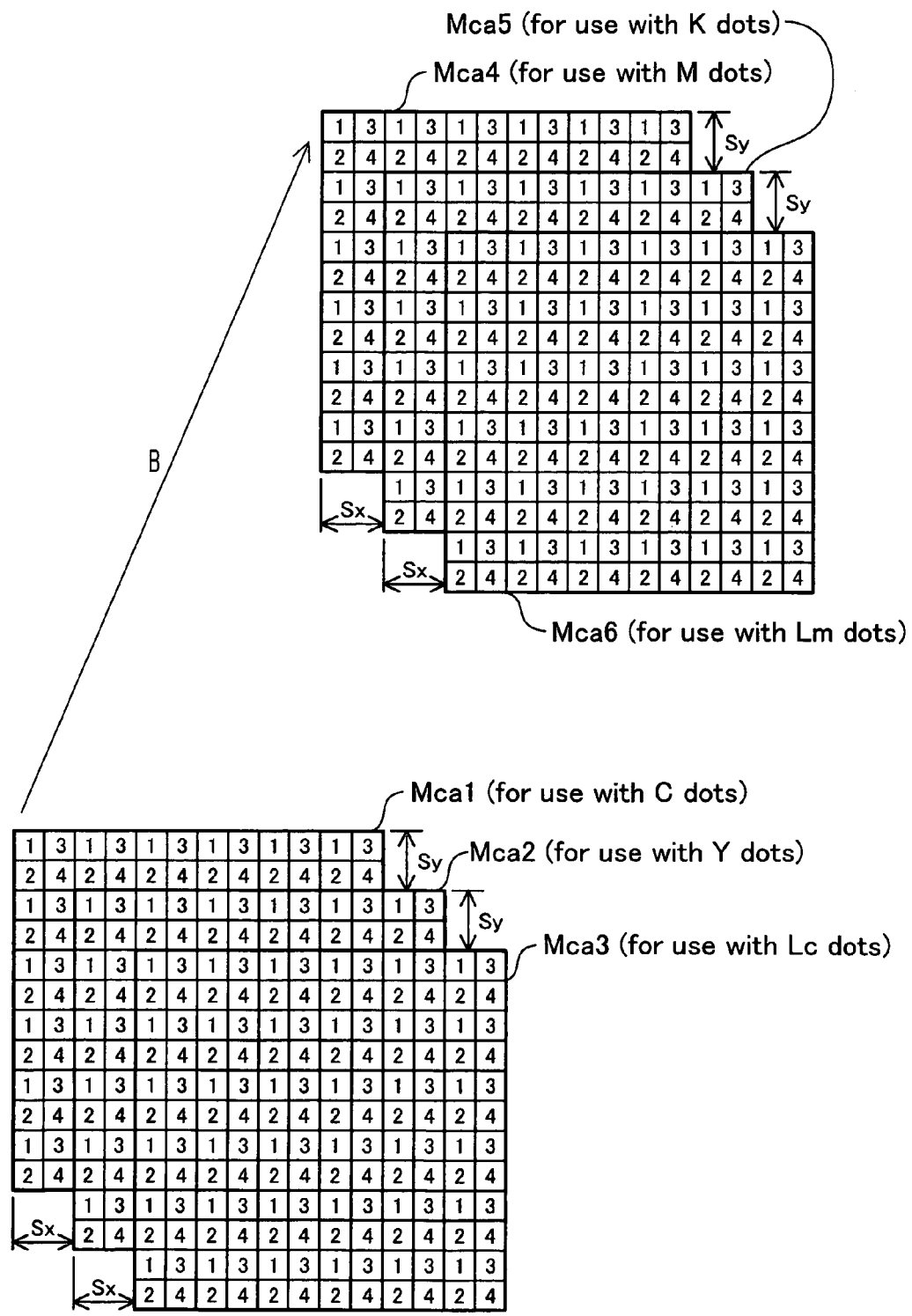
FIG. 35 is an illustration showing the contents of a matrix shifting process in a modification.

Furthermore, if deterioration of image quality due to color mixture among three nozzle arrays C, Y, Lm and/or color mixture among three nozzle arrays Mz, K, Lc is more pronounced than that due to other color mixture, the common dither matrix Mc generated in the first embodiment may be used and arranged as shown in FIG. 35. In this way, the number of dither matrices to be targeted for evaluation can be reduced to three, so that deterioration of image quality due to color mixture among the three colors mentioned above can be restrained intensively.

E-2. First Modification:

Although in the above embodiments, graininess index is used as a scale of dither matrix evaluation; however, it would also be acceptable to use other scales, such as RMS granularity, for example, which will be described later. The RMS granularity can be determined by subjecting dot density values to a low pass filtering process using a low pass filter and then calculating a standard deviation of the density values after the low pass filtering process.

Figure 36:
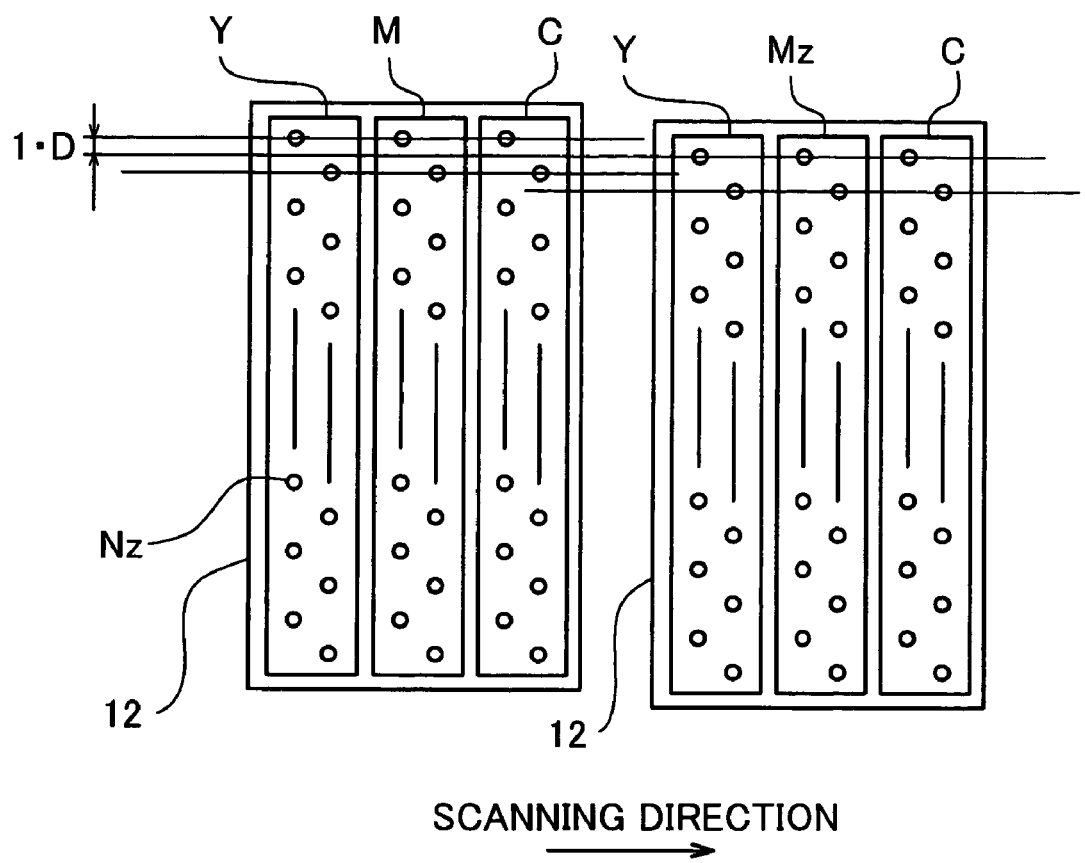
FIG. 36 is an illustration showing two print heads 12 that are arranged in a zigzag alignment, in a line printer of a modification.

E-3. Second Modification:

The present invention is also applicable to a line printer that performs printing only by scanning a printing medium. FIG. 36 is an illustration showing two print heads 12 that are arranged in a zigzag alignment, in a line printer of a modification. In such case, the adjustment of dither matrix may be performed as six pixel groups for each nozzle array, or may alternatively be performed as three pixel groups for each color.

E-4. Although in the above embodiments and/or modifications, the evaluation value is calculated by using graininess indices, RMS granularities, or the like of dot patterns that are composed of dots of two or more colors among a plurality of colors available in a printer; however, it may also be acceptable to employ a potential method as well, which stores threshold values into elements in order of increasing dot densities of corresponding pixels after the low pass filtering process. Note that, in case where a low pass filter is used, not only the above-described weighting process may be performed but the range of the low pass filter may also be adjusted, according to the degree of deterioration of image quality due to color mixture. For example, if it is desired to restrain contact and/or overlap of dots more intensively than dispersibility of dots, then it can be dealt with by narrowing down the range of the low pass filter.

Furthermore, the evaluation value is not restricted to graininess indices and/or RMS granularities of dot patterns, but it would also be acceptable to apply an evaluation scale used by Dooley et al. of Xerox Corporation (GS value: Grainess scale) to dot patterns and evaluate optimality of dither matrix by using the GS value. Here, the GS value is a graininess evaluation value that can be obtained by: digitizing dot patterns by performing a predetermined process including two-dimensional Fourier transformation; performing a filtering process of multiplying them by a visual spatial frequency characteristic VTF; and integrating them thereafter. The evaluation value may also be a coefficient of correlation with the state in which the degree of contact among dots is reduced as a consequence (blue noise characteristic and/or green noise characteristic).

E-5. Although in the above embodiments, the evaluation process is performed for each storage element for storing a threshold value; however, the present invention would also be applicable to cases where, for example, storage elements for storing a plurality of threshold values are determined simultaneously at one time. Specifically, for example, in case where storage elements for first to sixth threshold values have been determined and storage elements for seventh and eighth threshold values are now to be determined in the above embodiments, storage elements for the seventh and eighth threshold values may be determined based on an evaluation value associated with the time a dot has been added to a storage element for the seventh threshold value and an evaluation value associated with the time dots have respectively been added to storage elements for the seventh and eighth threshold values, or alternatively, only a storage element for the seventh threshold value may be determined.

E-6. Although in the above embodiments, storage elements of threshold values are determined in sequence; however, it would also be acceptable to generate a dither matrix by adjusting a dither matrix that was prepared in advance as initial state. For example, a dither matrix may be generated by: preparing a dither matrix that stores a plurality of threshold values in respective elements as initial state, where each of the threshold values is used for determination of dot on/off state of each pixel according to an input tone value; adjusting the dither matrix as initial state by replacing a part of the plurality of threshold values stored in the respective elements with different threshold value(s) stored in other element(s) by using a method determined in a random or organized way; and determining whether or not to make the replacement based on evaluation values respectively associated with the time before and after the replacement.

E-7. Although in the above embodiments, dot on/off states of pixels are determined through comparison on a pixel-by-pixel basis of threshold values established in the dither matrix to the tone values of image data; however, it would also be acceptable to determine the dot on/off state by comparing the sum of threshold value and tone value to a fixed value, for example. It would also be acceptable to determine the dot on/off state according to tone values, and data created previously on the basis of threshold values, rather than using threshold values directly.

Furthermore, in techniques disclosed in JP-A-2005-236768 and JP-A-2005-269527 that employ intermediate data (number data) for specifying state of dot formation, a dither matrix of the present invention has a broader concept that also includes the use of conversion table (or correspondence relationship table) generated using the dither matrix. Such conversion table is not only generated directly from a dither matrix generated by a generation method of the present invention, but may sometimes be adjusted or modified as well, and such cases also fall under the category of a dither matrix generated by the generation method of the present invention.

E-8. Although in the above embodiments, inks with different densities (e.g. light cyan ink and cyan ink) are treated as different colors; however, it would also be acceptable to treat them as the same color.

The predetermined conversion process described above may also be a process that includes at least one of shifting of the reference matrix in the main scanning direction and shifting of the reference matrix in the sub-scanning direction.

The reference matrix may be set such that a predetermined color-mixed pattern composed of the M colors of dot groups (M is an integer of three or more) has a predetermined spatial frequency characteristic defined previously. In this way, it is possible to set the reference matrix in an easy way by performing evaluation with a focus only on a single color-mixed pattern.

Each of predetermined conversion process may be configured as a shifting process of a shift amount that is 1 through (N−1) times (N is an integer of M or more) a predetermined unit shift amount. The reference matrix may be set such that, every predetermined color-mixed pattern that is composed of a dot group of a reference color for which state of dot formation is determined by the reference matrix, among the M colors, and a dot group of either one of colors other than the reference color, among the M colors, has a predetermined spatial frequency characteristic defined previously.

In this way, a reference matrix can be set more adequately by performing evaluation with a focus on a color-mixed pattern of two colors that is composed of a dot group of a reference color for which state of dot formation is determined by the reference matrix and another dot group for which state of dot formation is determined by a converted matrix. The reason the reference matrix is set more adequately is that a color-mixed pattern of two colors in a halftone range makes the problem of granularity more pronounced in print images. To the contrary, in case of a color-mixed pattern of three colors, the evaluation becomes difficult due to excess number of dots.

Although a color-mixed pattern of two colors that is composed of a dot group of a reference color and another dot group is targeted for evaluation, however, the same effect can also be attained for other combinations of colors depending only on their shift amounts. This is because every converted matrix is generated by executing a shifting process of a shift amount of an integral multiple on a single reference matrix. Therefore, the reference matrix and each converted matrix can have a relative relationship that depends only on its shift amount. For example, every color-mixed pattern that is composed of dot groups for which states of dot formation are respectively determined by two matrices shifted by a shift amount of one time from each other can have the same feature.

Each of predetermined conversion process may be configured as a shifting process of a shift amount that is 1 through (N−1) times a predetermined unit shift amount. The reference matrix may be set such that, every predetermined color-mixed pattern that is composed of a dot group of a reference color for which state of dot formation is determined by the reference matrix, among the M colors, and each dot group for which state of dot formation is determined by each of a plurality of converted matrices generated by executing a shifting process of a shift amount of 2Q (Q is an integer of 0, 1, or more) multiple of a predetermined shift amount, among the M colors, has a predetermined spatial frequency characteristic defined previously.

In this way, dispersibility of a specific color-mixed pattern can further be improved by reducing the number of color-mixed patterns targeted for evaluation. This is because in the setting of dither matrix, the more the number of targets of evaluation, the less the degree of freedom available for the adjustment of each target of evaluation, and at the same time the degree of deterioration of image quality due to contact among dot groups may also be different, so that image quality can be improved by assigning more degrees of design freedom to those dither matrices that are associated with dot groups with pronounced deterioration of image quality therebetween.

The print head may have a plurality of nozzle array groups. Each of the nozzle array groups have L colors (L is an integer less than M) of nozzle arrays aligned in the main scanning direction. Each of the nozzle arrays have a plurality of nozzles aligned in the sub-scanning direction. The L colors of nozzle arrays are arranged in such a way that forms a same main scan line in a same main scan. The plurality of nozzle array groups may be arranged at positions shifted from each other in the sub-scanning direction. The reference matrix may be set in such a way that restrains contact among the L colors of dot groups. This allows for efficient reduction of the number of color-mixed patterns targeted for evaluation.

The reference matrix may be set such that a dot pattern of each of the N colors of dot groups has a predetermined spatial frequency characteristic defined previously.

The predetermined spatial frequency characteristic may be such a characteristic that a frequency range, within which a predetermined color-mixed pattern composed of the dot groups of the specific two or more colors gets closest to a predetermined spatial frequency characteristic of the dot pattern of the print image, exists within a predetermined low-frequency domain not greater than four cycles per millimeter, within which visual sensitivity of human is at a relatively high level on a printing medium that is placed at an observation distance of 300 mm.

In this way, it is possible to reduce granularity in a domain within which visual sensitivity of human is at a high level and thereby effectively improve image quality with a focus on visual sensitivity of human. Here, note that not only graininess index and/or RMS granularity which will be described later, but also various scales for representing dispersibility of dots may be used as well, such as an evaluation scale used by Dooley et al. of Xerox Corporation (GS value: Grainess scale).

The predetermined characteristic may be graininess index that is calculated by a computing process including a Fourier transformation process. The graininess index may be calculated based on a product of a VTF function that is determined based on visual spatial frequency characteristic and a constant that is previously calculated by the Fourier transformation process. Or alternatively, the predetermined characteristic may be RMS granularity that is calculated by a computing process including a low pass filtering process.

Finally, the Japanese patent application (JP2006-352627 filed on Dec. 27, 2006) on which the priority claim of the present application is based is incorporated herein by reference.

What is claimed is:

1. A printing method of printing on a printing medium, comprising:
   providing a print head that includes a plurality of nozzle arrays for ejecting at least N colors of inks, N being an integer of at least 3;
   performing a halftone process with a dither matrix on image data that represents a tone value for each pixel making up an original image to generate dot data that represents a state of dot formation at each pixel of a print image to be formed on the printing medium; and
   generating the print image by combining at least N colors of dot groups formed in at least one scan of the print head in a common print area, the plurality of nozzle arrays respectively forming dot groups having different colors from each other in the each scan of the print head according to the dot data, wherein
   the dither matrix includes a single reference matrix that is set by determining threshold values in the reference matrix based on a predetermined index value, said predetermined index value being calculated based on an arrangement pattern of at least two colors of dot groups among M colors (M is an integer of at least 3 and less or equal to N) of dot groups among the at least N colors of dot groups, with respect to at least some tone values among the input tone values, and
   the performing includes N different halftone processes, each of the N different halftone processes being performed on each of the at least N colors of inks by using the dither matrix that includes the reference matrix and (N−1) converted matrices generated by executing one of at least one type of predetermined conversion process (N−1) times on the reference matrix.

2. The printing method according to claim 1, wherein the predetermined conversion process includes a process of at least one of shifting of the reference matrix in the main scanning direction and a process of shifting of the reference matrix in the sub-scanning direction.

3. The printing method according to claim 1, wherein the reference matrix is set such that a predetermined color-mixed pattern composed of the M colors of dot groups has a predetermined spatial frequency characteristic.

4. The printing method according to claim 3, wherein the predetermined spatial frequency characteristic is such a characteristic that a predetermined color-mixed pattern composed of the M colors of dot groups gets closest to a predetermined spatial frequency characteristic of the dot pattern of the print image within a predetermined low-frequency domain not greater than four cycles per millimeter, the predetermined low-frequency domain within which visual sensitivity of human is at a relatively high level on a printing medium that is placed at an observation distance of 300 mm.

5. The printing method according to claim 4, wherein the predetermined characteristic is a graininess index that is calculated by a computing process including a Fourier transformation process, and the graininess index is calculated based on a product of a VTF function that is determined based on visual spatial frequency characteristic and a constant that is previously calculated by the Fourier transformation process.

6. The printing method according to claim 4, wherein the predetermined characteristic is a RMS granularity that is calculated by a computing process including a low pass filtering process.

7. The printing method according to claim 1, wherein each of the at least one type of predetermined conversion process is configured as a shifting process of a shift amount that is 1 through (N−1) times a predetermined unit shift amount, and
the reference matrix is set such that every predetermined color-mixed pattern has a predetermined spatial frequency characteristic, the predetermined color-mixed pattern being composed of a dot group of a reference color among the M colors and a dot group of either one of colors other than the reference color among the M colors, or a state of dot formation of the dot group of a reference color being determined by the reference matrix.

8. The printing method according to claim 1, wherein each of the at least one type of predetermined conversion process is configured as a shifting process of a shift amount that is 1 through (N−1) times a predetermined unit shift amount, and the reference matrix is set such that every predetermined color-mixed pattern has a predetermined spatial frequency characteristic, the predetermined color-mixed pattern being composed of a dot group of a reference color among the M colors and any dot group of either one of colors other than the reference color among the M colors, or a state of dot formation of the dot group of a reference color being determined by the reference matrix, a state of dot formation of the any dot group being determined by each of a plurality of converted matrices generated by executing a shifting process of a shift amount of the Qth power of 2 multiple of a predetermined shift amount, Q being an integer of at least 0.

9. The printing method according to claim 1, wherein
the print head has a plurality of nozzle array groups, each of the nozzle array groups having L colors (L is an integer less than M) of nozzle arrays aligned in the main scanning direction, each of the nozzle arrays having a plurality of nozzles aligned in the sub-scanning direction, the L colors of nozzle arrays being arranged in such a way that forms a same main scan line in a same main scan, the plurality of nozzle array groups are arranged at positions shifted from each other in the sub-scanning direction, and
the reference matrix is set in such a way that restrains contact among the L colors of dot groups.

10. The printing method according to claim 1, wherein
the reference matrix is set such that a dot pattern of each of the N colors of dot groups has a predetermined spatial frequency characteristic.

11. A printing apparatus for printing on a printing medium, comprising:
a dot data generator that performs a halftone process with a dither matrix on image data that represents a tone value for each pixel making up an original image to generate dot data that represents a state of dot formation at each pixel of a print image to be formed on the printing medium; and
a print unit that has a print head that includes a plurality of nozzle arrays for ejecting at least N colors of inks, N being an integer of at least 3, and generates the print image by combining at least N colors of dot groups formed in at least one scan of the print head in a common print area, the plurality of nozzle arrays respectively forming dot groups having different colors each other in the each scan of the print head according to the dot data, wherein
the dither matrix includes a single reference matrix that is set by determining threshold values in the reference matrix based on a predetermined index value, said predetermined index value being calculated based on an arrangement pattern of at least two colors of dot groups among M colors (M is an integer of at least 3 and less or equal to N) of dot groups among the at least N colors of dot groups, with respect to at least some tone values among input tone values, and
the dot data generator performs N different halftone processes, each of the N different halftone processes being performed on each of the at least N colors of inks by using the dither matrix that includes the reference matrix and (N−1) converted matrices generated by executing one of at least one type of predetermined conversion process (N−1) times on the reference matrix.

12. A computer program product for causing a computer to generate print data to be supplied to a print unit with a print head that includes a plurality of nozzle arrays for ejecting at least N colors of inks, N being an integer of at least 3, the computer program product comprising:
a tangible computer readable medium; and
a computer program stored on the tangible computer readable medium, the computer program comprising:
a first program for causing the computer to perform a halftone process with a dither matrix on image data that represents a tone value for each pixel making up an original image to generate dot data that represents a state of dot formation at each pixel of a print image to be formed on the printing medium; and
a second program for causing the computer to generate the print image by combining at least N colors of dot groups formed in at least one scan of the print head in a common print area, the plurality of nozzle arrays respectively forming dot groups having different colors each other in the each scan of the print head according to the dot data, wherein
the dither matrix includes a single reference matrix that is set by determining threshold values in the reference matrix based on a predetermined index value being calculated based on an arrangement pattern of at least two colors of dot groups among M colors (M is an integer of at least 3 and less or equal to N) of dot groups among the at least N colors of dot groups, with respect to at least some tone values among input tone values, and
the first program includes a program for causing the computer to perform N different halftone processes, each of the N different halftone processes being performed on each of the at least N colors of inks by using the dither matrix that includes the reference matrix and (N−1) converted matrices generated by executing one of at least one type of predetermined conversion process (N−1) times on the reference matrix.

* * * * *